US011715190B2

(12) United States Patent
Ijiri

(10) Patent No.: US 11,715,190 B2
(45) Date of Patent: Aug. 1, 2023

(54) INSPECTION SYSTEM, IMAGE DISCRIMINATION SYSTEM, DISCRIMINATION SYSTEM, DISCRIMINATOR GENERATION SYSTEM, AND LEARNING DATA GENERATION DEVICE

(71) Applicant: OMRON Corporation, Kyoto (JP)

(72) Inventor: Yoshihisa Ijiri, Tokyo (JP)

(73) Assignee: OMRON Corporation, Kyoto (JP)

( * ) Notice: Subject to any disclaimer, the term of this patent is extended or adjusted under 35 U.S.C. 154(b) by 372 days.

(21) Appl. No.: 16/976,081

(22) PCT Filed: Mar. 13, 2019

(86) PCT No.: PCT/JP2019/010183
§ 371 (c)(1),
(2) Date: Aug. 27, 2020

(87) PCT Pub. No.: WO2019/176993
PCT Pub. Date: Sep. 19, 2019

(65) Prior Publication Data
US 2020/0402221 A1   Dec. 24, 2020

(30) Foreign Application Priority Data

Mar. 14, 2018   (JP) ................. 2018-047292

(51) Int. Cl.
*G06K 9/00*      (2022.01)
*G06T 7/00*      (2017.01)
(Continued)

(52) U.S. Cl.
CPC .......... *G06T 7/0004* (2013.01); *G06N 3/045* (2023.01); *G06N 3/084* (2013.01); *G06N 5/046* (2013.01);
(Continued)

(58) Field of Classification Search
CPC ............. G06T 7/0004; G06T 7/001; G06T 2207/20081; G06T 2207/20084;
(Continued)

(56) References Cited

U.S. PATENT DOCUMENTS

2015/0134578 A1   5/2015 Tamatsu et al.
2017/0103267 A1   4/2017 Mishra et al.
(Continued)

FOREIGN PATENT DOCUMENTS

CN   105938558   9/2016
CN   106548127   3/2017
(Continued)

OTHER PUBLICATIONS

Junhua Ding et al., "Augmentation and evaluation of training data for deep learning," 2017 IEEE International Conference on Big Data (Big Data), Dec. 2017, pp. 2603-2611.
(Continued)

*Primary Examiner* — Samir A Ahmed
(74) *Attorney, Agent, or Firm* — JCIPRNET

(57) ABSTRACT

Provided is a technique capable of generating a discriminator having high inference precision at low cost. An inspection system according to one aspect of the present invention generates, from first image data, plural pieces of second image data of a product; determines, by a first discriminator, whether to adopt each piece of the second image data as learning data; generates a learning data set by the second image data that is determined to be adopted as learning data; constructs, by applying machine learning using the generated learning data set, a second discriminator that determines the acceptability of a product; and uses the constructed second discriminator to determine the acceptability of a product in target image data.

15 Claims, 17 Drawing Sheets

(51) Int. Cl.
*G06N 20/20* (2019.01)
*G06N 3/084* (2023.01)
*G06N 5/046* (2023.01)
*G06N 3/045* (2023.01)
*G06V 10/764* (2022.01)
*G06V 10/82* (2022.01)
*G06V 10/44* (2022.01)
*G06V 40/16* (2022.01)

(52) U.S. Cl.
CPC ............ *G06N 20/20* (2019.01); *G06T 7/001* (2013.01); *G06V 10/454* (2022.01); *G06V 10/764* (2022.01); *G06V 10/82* (2022.01); *G06T 2207/20081* (2013.01); *G06T 2207/20084* (2013.01); *G06V 40/172* (2022.01); *G06V 40/174* (2022.01)

(58) Field of Classification Search
CPC ........ G06N 3/045; G06N 3/084; G06N 5/046; G06N 20/20; G06N 3/08; G06V 10/454; G06V 10/764; G06V 10/82; G06V 40/172; G06V 40/174; G06V 2201/06; G10L 25/51
See application file for complete search history.

(56) References Cited

U.S. PATENT DOCUMENTS

| | | | |
|---|---|---|---|
| 2018/0039861 A1* | 2/2018 | Saito | G06N 3/045 |
| 2018/0268256 A1* | 9/2018 | Di Febbo | G06V 10/82 |
| 2019/0013185 A1* | 1/2019 | Bhutta | H01J 37/32183 |
| 2019/0197356 A1* | 6/2019 | Kurita | G06V 10/774 |

FOREIGN PATENT DOCUMENTS

| | | |
|---|---|---|
| CN | 106991439 | 7/2017 |
| CN | 107563389 | 1/2018 |
| CN | 107729948 | 2/2018 |
| JP | 2011192032 | 9/2011 |
| JP | 2012026982 | 2/2012 |
| JP | 2015191426 | 11/2015 |
| JP | 2017168057 | 9/2017 |

OTHER PUBLICATIONS

"Search Report of Europe Counterpart Application", dated Apr. 13, 2022, p. 1-p. 11.

Justin Salamo et al., "Deep Convolutional Neural Networks and Data Augmentation for Environmental Sound Classification," IEEE Signal Processing Letters, Nov. 28, 2016, pp. 1-5.

Terry T. Um et al., "Data Augmentation of Wearable Sensor Data for Parkinson's Disease Monitoring using Convolutional Neural Networks," Proceedings of the 19th ACM International Conference on Multimodal Interaction, Nov. 13, 2017, pp. 216-220.

Toan Minh Tran et al., "A Bayesian Data Augmentation Approach for Learning Deep Models," 31st International Conference on Neural Information Processing Systems, Oct. 29, 2017, pp. 1-10.

"International Search Report (Form PCT/ISA/210) of PCT/JP2019/010183", dated May 21, 2019, with English translation thereof, pp. 1-4.

"Written Opinion of the International Searching Authority (Form PCT/ISA/237) of PCT/JP2019/010183", dated May 21, 2019, with English translation thereof, pp. 1-10.

"Office Action of China Counterpart Application", dated May 12, 2023, with English translation thereof, pp. 1-45.

* cited by examiner

INSPECTION SYSTEM, IMAGE DISCRIMINATION SYSTEM, DISCRIMINATION SYSTEM, DISCRIMINATOR GENERATION SYSTEM, AND LEARNING DATA GENERATION DEVICE

CROSS-REFERENCE TO RELATED APPLICATION

This application is a 371 application of the international PCT application serial no. PCT/JP2019/010183, filed on Mar. 13, 2019, which claims the priority benefit of Japan application no. 2018-047292, filed on Mar. 14, 2018. The entirety of each of the above—mentioned patent applications is hereby incorporated by reference herein and made a part of this specification.

BACKGROUND

Technical Field

The present invention relates to an inspection system, an image discrimination system, a discrimination system, a discriminator generation system, and a learning data generation device.

Related Art

Conventionally, in a scene such as a production line for manufacturing a product, a technique is used in which a product to be manufactured is photographed by a photographing device and the acceptability of the product is inspected based on the obtained image data. For example, in patent literature 1, an inspection device has been proposed which determines whether an inspection object in the image is normal or abnormal based on a first trained neural network, and classifies the type of abnormality based on a second trained neural network when the inspection object is determined to be abnormal.

LITERATURE OF RELATED ART

Patent Literature

Patent literature 1: Japanese Patent Laid-Open No. 2012-026982

SUMMARY

Problems to be Solved

The inventor of the present invention has found that the following problem may be generated in the conventional technique for using a discriminator configured by a learning model such as the neural network as in patent literature 1 to determine the acceptability of a product from image data. That is, when supervised learning is adopted as the machine learning in order to perform machine learning for causing a learning model to acquire the ability to determine the acceptability of a product, a learning data set configured by pairs of image data used as learning data and correct answer data indicating the correct answer for the acceptability determination of the product in the image data is prepared. When the number of pieces of the learning data is small, the precision of the acceptability determination performed by a trained learning model (discriminator) becomes insufficient.

On the other hand, it is costly to prepare a sufficient number of pieces of learning data sets in order to improve the precision of the discriminator determination.

Therefore, the inventor has considered to mass-produce plural pieces of different image data from the image data prepared as learning data and use the mass-produced plural pieces of image data as learning data. However, the acceptability of a product may not be correctly represented in the mass-produced plural pieces of image data. Therefore, it is unclear whether the mass-produced plural pieces of image data are appropriate as the learning data. When image data that is not appropriate as learning data is included, a problem may arise, that is, a discriminator capable of executing acceptability determination with high precision cannot be obtained even if the mass-produced plural pieces of image data are used as learning data to perform machine learning.

Besides, this problem is not unique to the scene for determining the acceptability of a product and the scene for performing supervised learning. A similar problem may arise in any scene where a discriminator is constructed by machine learning using learning data, such as a scene for discriminating some characteristic of a subject from image data and a scene for discriminating some characteristic from data other than image data. That is, in order to perform machine learning of a learning model, data used as learning data is prepared. When the number of pieces of the learning data is small, the precision of discriminating predetermined characteristics from target data by the discriminator becomes insufficient. On the other hand, it is costly to prepare a sufficient number of pieces of learning data in order to improve the precision of discriminating the characteristic.

The present invention has been made in view of these circumstances in one aspect, and an objective thereof is to provide a technique capable of generating a discriminator having high inference precision at low cost.

Means to Solve Problems

The present invention adopts the following configurations in order to solve the problems described above.

That is, an inspection system according to one aspect of the present invention that inspects the acceptability of a product includes: a data acquisition part that acquires first image data of the product and first correct answer data indicating a correct answer for an acceptability determination of the product in the first image data; a first generation part that generates plural pieces of second image data of the product respectively from the first image data by applying predetermined conversion processing to the first image data; a determination part that determines whether to adopt each piece of the second image data as learning data based on output obtained from a first trained discriminator by inputting each piece of the second image data to the first discriminator, the first discriminator has undergone machine learning for determining whether to adopt given image data as learning data; a second generation part that generates a learning data set configured by pairs of second image data and second correct answer data by adding the second correct answer data to the second image data, the second image data being determined to be adopted as learning data, the second correct answer data being determined based on the first correct answer data and indicating the correct answer for the acceptability determination of the product in the second image data; a learning processing part that constructs, by performing machine learning using the generated learning data set, a second trained discriminator that has acquired an ability to determine the acceptability of the product; a target data acquisition part that acquires target image data of the product to be inspected; and an acceptability determination part that determines, based on output obtained from the second discriminator by inputting the acquired target image data to the second discriminator, the acceptability of the product in the target image data.

The inspection system according to the configuration uses the first discriminator that has acquired the ability to determine whether to adopt the image data as learning data, to determine the eligibility of each piece of the second image data as learning data, the second image data being generated by applying the predetermined conversion processing to the first image data. Next, the inspection system according to the configuration generates a learning data set according to the second image data that is determined to be used as learning data, and constructs the second discriminator that has acquired the ability to determine the acceptability of a product by performing machine learning using the generated learning data. Then, the inspection system according to the configuration uses the constructed second discriminator to determine the acceptability of a product in target image data.

Consequently, according to the configuration, because it is possible to mass-produce the second image data serving as a candidate for learning data by applying the predetermined conversion processing to the first image data, it is possible to prepare a sufficient number of pieces of learning data sets at low cost. In addition, based on the result of the determination performed by the first discriminator, the second image data that is inappropriate as learning data can be excluded from the candidates for learning data. That is, it is possible to prevent, using the first discriminator, the second image data that is inappropriate as learning data from being used for machine learning of the second discriminator. Therefore, it is possible to prepare a sufficient number of pieces of appropriate learning data sets at low cost, and to construct a second discriminator having relatively high precision of determining the acceptability of a product by performing machine learning using the prepared learning data sets. Thus, according to the configuration, it is possible to generate a discriminator (second discriminator) having relatively high inference (acceptability determination) precision at low cost.

Besides, the "product" may not be particularly limited and may be appropriately selected according to the embodiment. The "product" may be, for example, a product transported on a production line for electronic parts, automobile parts, or the like. The electronic parts are, for example, substrates, chip capacitors, liquid crystals, relay windings, and the like. The automobile parts are, for example, connecting rods, shafts, engine blocks, power window switches, panels, and the like. The "acceptability determination" may be simple determination on whether the product has defects, or may include, in addition to the determination on whether the product has defects, discrimination for the type of the defects. The defects are, for example, scratches, dirt, cracks, dents, dust, burrs, color unevenness, and the like. The "learning data" may also be referred to as "training data". The "conversion processing" may not be particularly limited as long as this processing changes at least a part of the first image data and can generate the second image data that does not completely match the first image data.

In the inspection system according to the above aspect, the first generation part may generate the plural pieces of second image data from the first image data by applying, to the first image data, conversion processing selected from photometric conversion, geometric conversion, image synthesis, image replacement, and a combination thereof. According to the configuration, it is possible to mass-produce the second image data serving as a candidate for learning data at low cost, and thereby it is possible to generate a discriminator (second discriminator) having relatively high inference precision at lower cost. Besides, the photometric conversion processing is processing for converting brightness such as image brightness, which is, for example, brightness conversion processing or the like. The geometric conversion processing is processing for converting image spatial coordinates, which is, for example, an affine conversion, a projective conversion, or the like. The image synthesis is to synthesize a predetermined image such as noise in at least a part of the image data. The image replacement is to replace at least a part of the image data with another image. A converter constructed by machine learning may be used for these conversion processing.

In the inspection system according to the above aspect, the first discriminator may be configured by a discrimination model of a network including a generation model and the discrimination model, the generation model performing machine learning on an image data group configured by third image data to generate fourth image data similar to the third image data and repeating the machine learning to generate the fourth image data similar to the third image data in which the discrimination model misdiscriminates, the discrimination model performing machine learning to discriminate whether input data that is input is the fourth image data derived from the generation model or the third image data derived from the image data group, and to discriminate the third image data from the fourth image data that is generated by the generation model repeatedly subjected to the machine learning. According to the configuration, because it is possible to prepare the first discriminator capable of appropriately determining the eligibility of the second image data as image data, it is possible to generate a discriminator (second discriminator) having higher inference precision at low cost.

In the inspection system according to the above aspect, the determination part may use, as the first discriminator, a trained learner that is generated by machine learning using fifth image data and third correct answer data indicating the correct answer for whether to adopt the fifth image data as the learning data. According to the configuration, because it is possible to prepare the first discriminator capable of appropriately determining the eligibility of the second image data as image data, it is possible to generate a discriminator (second discriminator) having higher inference precision at low cost.

In addition, from the inspection system according to each of the above forms, for example, a part such as a part for generating the learning data group and a part for constructing the second discriminator is extracted to constitute a system or a device according to another form.

For example, a discriminator generation system according to one aspect of the present invention includes: a data acquisition part that acquires first image data of a product and first correct answer data indicating the correct answer for the acceptability determination of the product in the first image data; a first generation part that generates plural pieces of second image data of the product respectively from the first image data by applying predetermined conversion processing to the first image data; a determination part that determines whether to adopt each piece of the second image data as learning data based on output obtained from a first trained discriminator by inputting each piece of the second image data to the first discriminator, the first discriminator has undergone machine learning for determining whether to adopt given image data as learning data; a second generation part that generates a learning data set configured by pairs of second image data and second correct answer data by adding the second correct answer data to the second image data, the second image data being determined to be adopted as learning data, the second correct answer data being determined based on the first correct answer data and indicating the correct answer for the acceptability determination of the product in the second image data; and a learning processing part that constructs, by performing machine learning using the generated learning data set, a second trained discriminator that has acquired the ability to determine the acceptability of the product.

In addition, for example, a learning data generation device according to one aspect of the present invention includes: a data acquisition part that acquires first image data of a product and first correct answer data indicating the correct answer for the acceptability determination of the product in the first image data; a first generation part that generates plural pieces of second image data of the product respectively from the first image data by applying predetermined conversion processing to the first image data; a determination part that determines whether to adopt each piece of the second image data as learning data based on output obtained from a first trained discriminator by inputting each piece of the second image data to the first discriminator, the first discriminator has undergone machine learning for determining whether to adopt given image data as learning data; and a second generation part that generates a learning data set configured by pairs of second image data and second correct answer data by adding the second correct answer data to the second image data, the second image data being determined to be adopted as learning data, the second correct answer data being determined based on the first correct answer data and indicating the correct answer for the acceptability determination of the product in the second image data.

In addition, the inspection system according to each of the above forms may be applicably changed in any scene where a discriminator is constructed by machine learning, such as a scene for discriminating some characteristic from image data other than the image data of a product and a scene for discriminating some characteristic from data including another type of data other than image data.

For example, an image discrimination system according to one aspect of the present invention includes: a data acquisition part that acquires first image data of a predetermined subject; a first generation part that generates plural pieces of second image data of the subject respectively from the first image data by applying predetermined conversion processing to the first image data; a determination part that determines whether to adopt each piece of the second image data as learning data based on output obtained from a first trained discriminator by inputting each piece of the second image data to the first discriminator, the first discriminator has undergone machine learning for determining whether to adopt given image data as learning data; a second generation part that generates, by collecting second image data determined to be adopted as learning data, a learning data group configured by the plural pieces of second image data determined to be adopted as learning data; a learning processing part that constructs a second trained discriminator that has acquired the ability to discriminate the characteristics of the subject by performing machine learning using the generated learning data group; a target data acquisition part that acquires target image data of the subject in which the characteristics are discriminated; and a discrimination part that discriminates the characteristics of the subject in the target image data based on output obtained from the second discriminator by inputting the acquired target image data to the second discriminator.

The "subject" and the "characteristics" of the subject to be discriminated may not be particularly limited and may be appropriately selected according to the embodiment. The "subject" may be, for example, a face of the target, a body of the target, a work-piece to be worked, or the like. In addition, when the subject is a face of the target, the characteristics to be discriminated may be, for example, the type of facial expression, the state of face parts, and the like. When the subject is a body of the target, the characteristics to be discriminated may be, for example, the pose of the body, and the like. When the subject is a work-piece to be worked, the characteristics to be discriminated may be, for example, the position and orientation of the work-piece, and the like.

In addition, for example, a discriminator generation system according to one aspect of the present invention includes: a data acquisition part that acquires first image data of a predetermined subject; a first generation part that generates plural pieces of second image data of the subject respectively from the first image data by applying predetermined conversion processing to the first image data; a determination part that determines whether to adopt each piece of the second image data as learning data based on output obtained from a first trained discriminator by inputting each piece of the second image data to the first discriminator, the first discriminator has undergone machine learning for determining whether to adopt given image data as learning data; a second generation part that generates, by collecting second image data determined to be adopted as learning data, a learning data group configured by the plural pieces of second image data determined to be adopted as learning data; and a learning processing part that constructs a second trained discriminator that has acquired the ability to discriminate the characteristics of the subject by performing machine learning using the generated learning data group.

In addition, for example, a learning data generation device according to one aspect of the present invention includes: a data acquisition part that acquires first image data of a predetermined subject; a first generation part that generates plural pieces of second image data of the subject respectively from the first image data by applying predetermined conversion processing to the first image data; a determination part that determines whether to adopt each piece of the second image data as learning data based on output obtained from a first trained discriminator by inputting each piece of the second image data to the first discriminator, the first discriminator has undergone machine learning for determining whether to adopt given image data as learning data; and a second generation part that generates, by collecting second image data determined to be adopted as learning data, a learning data group configured by the plural pieces of second image data determined to be adopted as learning data.

In addition, for example, a discrimination system according to one aspect of the present invention includes: a data acquisition part that acquires first data including predetermined characteristics; a first generation part that generates plural pieces of second data from the first data by applying predetermined conversion processing to the first data; a determination part that determines whether to adopt each piece of the second data as learning data based on output obtained from a first trained discriminator by inputting each piece of the second data to the first discriminator, the first discriminator has undergone machine learning for determining whether to adopt given data as learning data; a second generation part that generates, by collecting second data determined to be adopted as learning data, a learning data group configured by the plural pieces of second data determined to be adopted as learning data; a learning processing part that constructs a second trained discriminator that has acquired the ability to discriminate the characteristics by performing machine learning using the generated learning data group; a target data acquisition part that acquires target data comprising the characteristics to be discriminated; and a discrimination part that discriminates the characteristics of the target data based on output obtained from the second discriminator by inputting the acquired target data to the second discriminator.

Besides, the "data" may include all types of data that can be analyzed by the discriminator, which may be, for example, in addition to image data, sound data (voice data), numerical data, text data, output data from other sensors, or the like. The "characteristic" may include all characteristics that can be discriminated from the data. When the "data" is sound data, the "characteristic" may be, for example, whether a specific sound (for example, an abnormal noise of the machine) is included. In addition, when the "data" is numerical data or text data related to biological data such as the blood pressure and the activity amount, the "characteristic" may be, for example, the target state or the like. In addition, when the "data" is numerical data or text data such as the drive amount of a machine, the "characteristic" may be, for example, the machine state or the like. The "discriminator" may be configured by, for example, a learning model capable of acquiring the ability to perform a predetermined inference by machine learning, such as a neural network, a support vector machine, a self-organizing map, and a reinforcement learning model.

In the discrimination system according to the above aspect, the first data may be sound data, and the first generation part may generate plural pieces of second data from the first data by applying, to the first data, the conversion processing selected from time stretch, pitch shift, masking, amplitude conversion, sound synthesis, and a combination thereof.

In addition, for example, a discriminator generation system according to one aspect of the present invention includes: a data acquisition part that acquires first data including predetermined characteristics; a first generation part that generates plural pieces of second data from the first data by applying predetermined conversion processing to the first data; a determination part that determines whether to adopt each piece of the second data as learning data based on output obtained from a first trained discriminator by inputting each piece of the second data to the first discriminator, the first discriminator has undergone machine learning for determining whether to adopt given data as learning data; a second generation part that generates, by collecting second data determined to be adopted as learning data, a learning data group configured by the plural pieces of second data determined to be adopted as learning data; and a learning processing part that constructs a second trained discriminator that has acquired the ability to discriminate the characteristics by performing machine learning using the generated learning data group.

In addition, for example, a learning data generation device according to one aspect of the present invention includes: a data acquisition part that acquires first data including predetermined characteristics; a first generation part that generates plural pieces of second data from the first data by applying predetermined conversion processing to the first data; a determination part that determines whether to adopt each piece of the second data as learning data based on output obtained from a first trained discriminator by inputting each piece of the second data to the first discriminator, the first discriminator has undergone machine learning for determining whether to adopt given data as learning data; and a second generation part that generates, by collecting second data determined to be adopted as learning data, a learning data group configured by the plural pieces of second data determined to be adopted as learning data.

Besides, as another aspect of each of the inspection system, the image discrimination system, the discrimination system, the discriminator generation system, and the learning data generation device according to each of the above forms, one aspect of the present invention may be an information processing method or a program for realizing a part or all of the above configurations, or a storage medium that stores this program and is readable by a computer and other devices, machines. Here, the computer-readable storage medium is a medium that accumulates information such as programs by electrical, magnetic, optical, mechanical, or chemical action.

For example, an inspection method according to one aspect of the present invention is an information processing method for inspecting the acceptability of a product in which a computer executes: a step for acquiring first image data of the product and first correct answer data indicating the correct answer for the acceptability determination of the product in the first image data; a step for generating plural pieces of second image data of the product respectively from the first image data by applying predetermined conversion processing to the first image data; a step for determining whether to adopt each piece of the second image data as learning data based on output obtained from a first trained discriminator by inputting each piece of the second image data to the first discriminator, the first discriminator has undergone machine learning for determining whether to adopt given image data as learning data; a step for generating a learning data set configured by pairs of second image data and second correct answer data by adding the second correct answer data to the second image data, the second image data being determined to be adopted as learning data, the second correct answer data being determined based on the first correct answer data and indicating the correct answer for the acceptability determination of the product in the second image data; a step for constructing, by performing machine learning using the generated learning data set, a second trained discriminator that has acquired the ability to determine the acceptability of the product; a step for acquiring target image data of the product to be inspected; and a step for determining, based on output obtained from the second discriminator by inputting the acquired target image data to the second discriminator, the acceptability of the product in the target image data.

In addition, for example, a discriminator generation method according to one aspect of the present invention is an information processing method in which a computer executes: a step for acquiring first image data of the product and first correct answer data indicating the correct answer for the acceptability determination of the product in the first image data; a step for generating plural pieces of second image data of the product respectively from the first image data by applying predetermined conversion processing to the first image data; a step for determining whether to adopt each piece of the second image data as learning data based on output obtained from a first trained discriminator by inputting each piece of the second image data to the first discriminator, the first discriminator has undergone machine learning for determining whether to adopt given image data as learning data; a step for generating a learning data set configured by pairs of second image data and second correct answer data by adding the second correct answer data to the second image data, the second image data being determined to be adopted as learning data, the second correct answer data being determined based on the first correct answer data and indicating the correct answer for the acceptability determination of the product in the second image data; and a step for constructing, by performing machine learning using the generated learning data set, a second trained discriminator that has acquired the ability to determine the acceptability of the product.

In addition, for example, a learning data generation method according to one aspect of the present invention is an information processing method in which a computer executes: a step for acquiring first image data of the product and first correct answer data indicating the correct answer for the acceptability determination of the product in the first image data; a step for generating plural pieces of second image data of the product respectively from the first image data by applying predetermined conversion processing to the first image data; a step for determining whether to adopt each piece of the second image data as learning data based on output obtained from a first trained discriminator by inputting each piece of the second image data to the first discriminator, the first discriminator has undergone machine learning for determining whether to adopt given image data as learning data; and a step for generating a learning data set configured by pairs of second image data and second correct answer data by adding the second correct answer data to the second image data, the second image data being determined to be adopted as learning data, the second correct answer data being determined based on the first correct answer data and indicating the correct answer for the acceptability determination of the product in the second image data.

In addition, for example, a generation program according to one aspect of the present invention is a program for causing a computer to execute: a step for acquiring first image data of the product and first correct answer data indicating the correct answer for the acceptability determination of the product in the first image data; a step for generating plural pieces of second image data of the product respectively from the first image data by applying predetermined conversion processing to the first image data; a step for determining whether to adopt each piece of the second image data as learning data based on output obtained from a first trained discriminator by inputting each piece of the second image data to the first discriminator, the first discriminator has undergone machine learning for determining whether to adopt given image data as learning data; and a step for generating a learning data set configured by pairs of second image data and second correct answer data by adding the second correct answer data to the second image data, the second image data being determined to be adopted as learning data, the second correct answer data being determined based on the first correct answer data and indicating the correct answer for the acceptability determination of the product in the second image data.

In addition, for example, an image discrimination method according to one aspect of the present invention is an information processing method in which a computer executes: a step for acquiring first image data of a predetermined subject; a step for generating plural pieces of second image data of the subject respectively from the first image data by applying predetermined conversion processing to the first image data; a step for determining whether to adopt each piece of the second image data as learning data based on output obtained from a first trained discriminator by inputting each piece of the second image data to the first discriminator, the first discriminator has undergone machine learning for determining whether to adopt given image data as learning data; a step for generating, by collecting second image data determined to be adopted as learning data, a learning data group configured by the plural pieces of second image data determined to be adopted as learning data; a step for constructing a second trained discriminator that has acquired the ability to discriminate the characteristics of the subject by performing machine learning using the generated learning data group; a step for acquiring target image data of the subject in which the characteristics are discriminated; and a step for discriminating the characteristics of the subject in the target image data based on output obtained from the second discriminator by inputting the acquired target image data to the second discriminator.

In addition, for example, a discriminator generation method according to one aspect of the present invention is an information processing method in which a computer executes: a step for acquiring first image data of a predetermined subject; a step for generating plural pieces of second image data of the subject respectively from the first image data by applying predetermined conversion processing to the first image data; a step for determining whether to adopt each piece of the second image data as learning data based on output obtained from a first trained discriminator by inputting each piece of the second image data to the first discriminator, the first discriminator has undergone machine learning for determining whether to adopt given image data as learning data; a step for generating, by collecting second image data determined to be adopted as learning data, a learning data group configured by the plural pieces of second image data determined to be adopted as learning data; and a step for constructing a second trained discriminator that has acquired the ability to discriminate the characteristics of the subject by performing machine learning using the generated learning data group.

In addition, for example, a learning data generation method according to one aspect of the present invention is an information processing method in which a computer executes: a step for acquiring first image data of a predetermined subject; a step for generating plural pieces of second image data of the subject respectively from the first image data by applying predetermined conversion processing to the first image data; a step for determining whether to adopt each piece of the second image data as learning data based on output obtained from a first trained discriminator by inputting each piece of the second image data to the first discriminator, the first discriminator has undergone machine learning for determining whether to adopt given image data as learning data; and a step for generating, by collecting second image data determined to be adopted as learning data, a learning data group configured by the plural pieces of second image data determined to be adopted as learning data.

In addition, for example, a generation program according to one aspect of the present invention is a program for causing a computer to execute: a step for acquiring first image data of a predetermined subject; a step for generating plural pieces of second image data of the subject respectively from the first image data by applying predetermined conversion processing to the first image data; a step for determining whether to adopt each piece of the second image data as learning data based on output obtained from a first trained discriminator by inputting each piece of the second image data to the first discriminator, the first discriminator has undergone machine learning for determining whether to adopt given image data as learning data; and a step for generating, by collecting second image data determined to be adopted as learning data, a learning data group configured by the plural pieces of second image data determined to be adopted as learning data.

In addition, for example, a discrimination method according to one aspect of the present invention is an information processing method in which a computer executes: a step for acquiring first data including predetermined characteristics; a step for generating plural pieces of second data from the first data by applying predetermined conversion processing to the first data; a step for determining whether to adopt each piece of the second data as learning data based on output obtained from a first trained discriminator by inputting each piece of the second data to the first discriminator, the first discriminator has undergone machine learning for determining whether to adopt given data as learning data; a step for generating, by collecting second data determined to be adopted as learning data, a learning data group configured by the plural pieces of second data determined to be adopted as learning data; a step for constructing a second trained discriminator that has acquired the ability to discriminate the characteristics by performing machine learning using the generated learning data group; a step for acquiring target data comprising the characteristics to be discriminated; and a step for discriminating the characteristics of the target data based on output obtained from the second discriminator by inputting the acquired target data to the second discriminator.

In addition, for example, a discriminator generation method according to one aspect of the present invention is an information processing method in which a computer executes: a step for acquiring first data including predetermined characteristics; a step for generating plural pieces of second data from the first data by applying predetermined conversion processing to the first data; a step for determining whether to adopt each piece of the second data as learning data based on output obtained from a first trained discriminator by inputting each piece of the second data to the first discriminator, the first discriminator has undergone machine learning for determining whether to adopt given data as learning data; a step for generating, by collecting second data determined to be adopted as learning data, a learning data group configured by the plural pieces of second data determined to be adopted as learning data; and a step for constructing a second trained discriminator that has acquired the ability to discriminate the characteristics by performing machine learning using the generated learning data group.

In addition, for example, a learning data generation method according to one aspect of the present invention is an information processing method in which a computer executes: a step for acquiring first data including predetermined characteristics; a step for generating plural pieces of second data from the first data by applying predetermined conversion processing to the first data; a step for determining whether to adopt each piece of the second data as learning data based on output obtained from a first trained discriminator by inputting each piece of the second data to the first discriminator, the first discriminator has undergone machine learning for determining whether to adopt given data as learning data; and a step for generating, by collecting second data determined to be adopted as learning data, a learning data group configured by the plural pieces of second data determined to be adopted as learning data.

In addition, for example, a generation program according to one aspect of the present invention is a program for causing a computer to execute: a step for acquiring first data including predetermined characteristics; a step for generating plural pieces of second data from the first data by applying predetermined conversion processing to the first data; a step for determining whether to adopt each piece of the second data as learning data based on output obtained from a first trained discriminator by inputting each piece of the second data to the first discriminator, the first discriminator has undergone machine learning for determining whether to adopt given data as learning data; and a step for generating, by collecting second data determined to be adopted as learning data, a learning data group configured by the plural pieces of second data determined to be adopted as learning data.

Effect

According to the present invention, it is possible to provide a technique capable of generating a discriminator having high inference precision at low cost.

DESCRIPTION OF THE EMBODIMENTS

Figure 1:
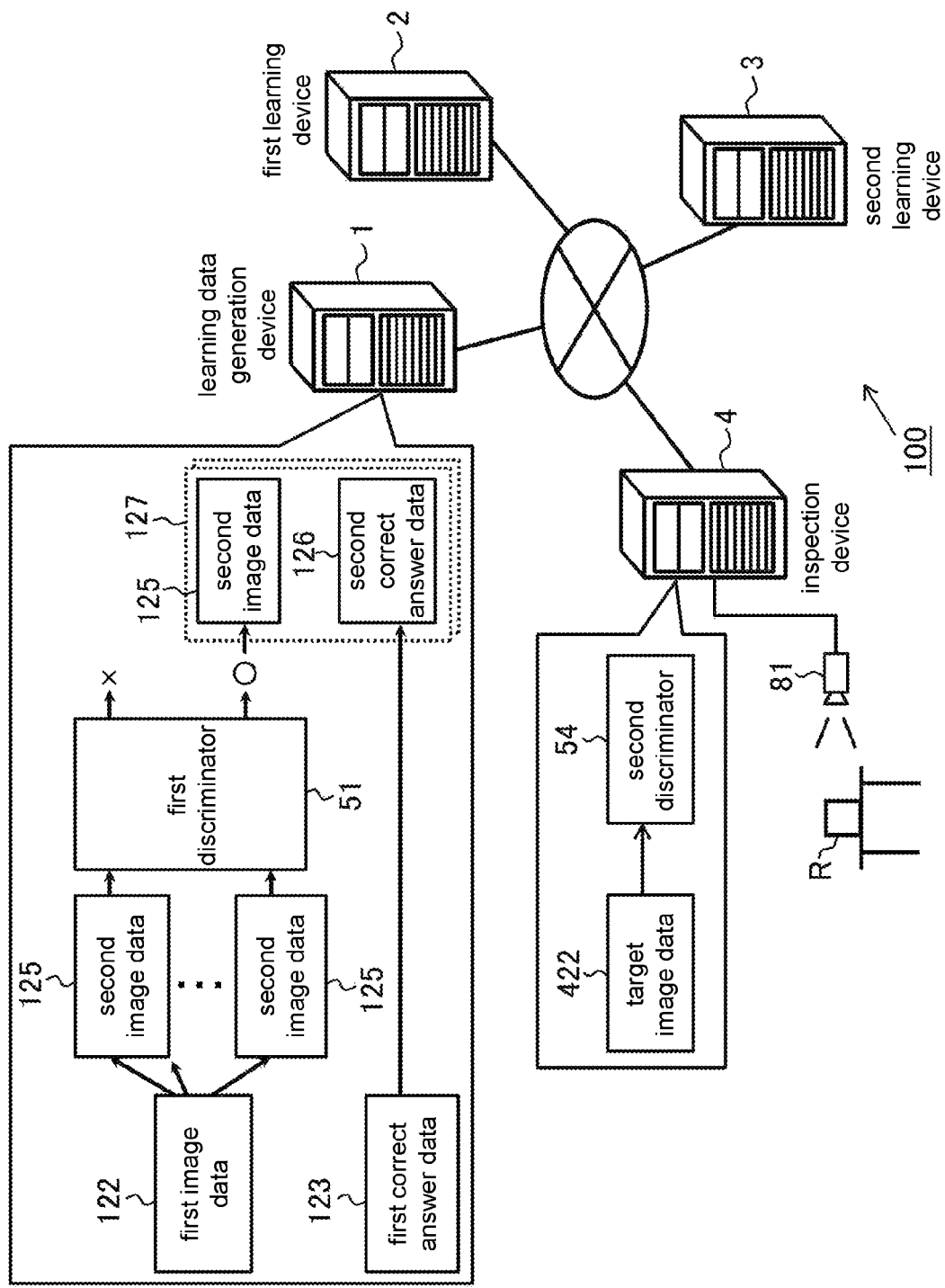
FIG. 1 schematically illustrates an example of a scene in which the present invention is applied.

Hereinafter, an embodiment according to one aspect of the present invention (hereinafter, also referred to as "the embodiment") is described with reference to the drawings. However, the embodiment described below is merely an example of the present invention in all aspects. It is evident that various improvements or modifications can be made without departing from the scope of the present invention. In other words, in implementing the present invention, a specific configuration according to the embodiment may be appropriately adopted. Besides, although the data that appears in the embodiment is described in natural language, more specifically, the data is specified by a computer-recognizable pseudo language, command, parameter, machine language, or the like.

§ 1 Application Example

First, an example of the basic configuration of the present invention is described. When a discriminator is constructed by machine learning using learning data, the following problems may be generated. That is, in order to perform machine learning of a learning model constituting the discriminator, data used as learning data is prepared. When the number of pieces of the learning data is small, the precision of discriminating predetermined characteristics from target data by the discriminator becomes insufficient. On the other hand, it is costly to prepare a sufficient number of pieces of learning data in order to improve the precision of the characteristic discrimination.

Therefore, in one example of the present invention, first data including predetermined characteristics is acquired, and plural pieces of second data are generated from the first data by applying predetermined conversion processing to the acquired first data. Next, a first trained discriminator having undergone machine learning for determining whether to adopt given data as learning data is used to determine whether to adopt each piece of the second data as learning data. By collecting second data determined to be adopted as learning data, a learning data group configured by the plural pieces of second data determined to be adopted as learning data is generated. Then, by performing machine learning using the generated learning data group, a second trained discriminator that has acquired the ability to discriminate the target characteristic is constructed.

Thereby, in this example of the present invention, because it is possible to mass-produce the second data serving as a candidate for learning data by applying the predetermined conversion processing to the first data, it is possible to prepare a sufficient number of pieces of learning data at low cost. In addition, based on the result of the determination performed by the first discriminator, the second data that is inappropriate as learning data can be excluded from the candidates for learning data. Therefore, according to the example of the present invention, it is possible to prepare a sufficient number of pieces of appropriate learning data at low cost, and to construct a second discriminator having relatively high precision of discriminating the target characteristic by performing machine learning using the prepared learning data group. Consequently, according to the example of the present invention, it is possible to generate a discriminator having relatively high inference precision at low cost.

Next, an example of a scene in which the present invention is applied is described with reference to FIG. 1. FIG. 1 schematically illustrates an example of a scene in which the present invention is applied to a visual inspection of a product R. However, the application range of the present invention is not limited to the example of the visual inspection described below. The present invention can be applied to all scenes in which a discriminator is constructed by machine learning using learning data.

An inspection system 100 illustrated in FIG. 1 includes a learning data generation device 1, a first learning device 2, a second learning device 3, and an inspection device 4 which are connected via a network, and is configured to inspect the acceptability of the product R. The type of network among the learning data generation device 1, the first learning device 2, the second learning device 3, and the inspection device 4 may not be particularly limited and may be appropriately selected from, for example, Internet, a wireless communication network, a mobile communication network, a telephone network, a dedicated network, and the like.

Besides, in the example of FIG. 1, the learning data generation device 1, the first learning device 2, the second learning device 3, and the inspection device 4 are respectively separate computers. However, the configuration of the inspection system 100 may not be limited to this example. At least one pair of the learning data generation device 1, the first learning device 2, the second learning device 3, and the inspection device 4 may be an integrated computer. In addition, the learning data generation device 1, the first learning device 2, the second learning device 3, and the inspection device 4 may be respectively configured by a plurality of computers.

The learning data generation device 1 according to the embodiment is a computer configured to generate learning data used for machine learning that causes a discriminator to acquire the ability to determine the acceptability of a product. Specifically, the learning data generation device 1 acquires first image data 122 of the product, and first correct answer data 123 indicating the correct answer for the acceptability determination of the product in the first image data 122. Then, the learning data generation device 1 generates plural pieces of second image data 125 in the product respectively from the first image data 122 by applying predetermined conversion processing to the acquired first image data 122.

The predetermined conversion processing may not be particularly limited as long as this processing changes at least a part of the first image data 122 and can generate the second image data 125 that does not completely match the first image data 122. The predetermined conversion processing may be selected from, for example, photometric conversion, geometric conversion, image synthesis, image replacement, and a combination thereof. The learning data generation device 1 generates the plural pieces of second image data 125 that are different from each other by repeatedly applying the predetermined conversion processing to the first image data 122 while changing the parameters of the conversion processing (for example, the amount of lightness to be converted, and the like). Each piece of generated second image data 125 is a candidate for learning data used in the machine learning for acquiring the ability to determine the acceptability of a product. However, each piece of the second image data 125 may not be appropriate as learning data because the image is unnatural, the product is not in a correct state, and the like.

Therefore, the learning data generation device 1 according to the embodiment inputs each piece of the second image data 125 to a first trained discriminator 51 having undergone machine learning for determining whether to adopt given image data as learning data, and thereby obtains output from the first discriminator 51. The output of the first discriminator 51 indicates the result of determining whether to adopt the image data as learning data used in machine learning for acquiring the ability to determine the acceptability of a product. Therefore, the learning data generation device 1 determines whether to adopt each piece of the second image data 125 as learning data based on the output obtained from the first discriminator 51.

Then, the learning data generation device 1 adds, to the second image data 125 determined as learning data, second correct answer data 126 that is determined based on the first correct answer data 123 and that indicates the correct answer for the acceptability determination of the product in the second image data 125. Thereby, the learning data generation device 1 generates a learning data set 127 configured by a pair of the second image data 125 and the second correct answer data 126.

On the other hand, the first learning device 2 according to the embodiment is a computer configured to construct the first discriminator 51 used in the learning data generation device 1. Specifically, the first learning device 2 performs machine learning using a learning data set (first learning data set 222 described later) configured by a combination of image data (image data 2221 described later) and correct answer data indicating the correct answer for the determination on whether to adopt the image data as learning data (acceptance/rejection data 2222 described later), and thereby constructs the first trained discriminator 51 that has acquired the ability to determine whether to adopt given image data as learning data.

In addition, the second learning device 3 according to the embodiment is a computer configured to construct the second discriminator 54 used in the inspection device 4. Specifically, the second learning device 3 performs machine learning using plural pieces of learning data sets including the learning data set 127 generated by the learning data generation device 1, and thereby constructs the second trained discriminator 54 that has acquired the ability to determine the acceptability of a product. Therefore, a discriminator generation system that constructs the second discriminator 54 is configured by the learning data generation device 1 and the second learning device 3.

In contrast, the inspection device 4 according to the embodiment is a computer configured by using the second discriminator 54 constructed by the second learning device 3 to determine the acceptability of the product R. Specifically, the inspection device 4 acquires target image data 422 of the product R to be inspected. In the embodiment, the inspection device 4 is connected to a camera 81, and acquires the target image data 422 by photographing the product R with the camera 81. Then, the inspection device 4 obtains output from the second discriminator 54 by inputting the acquired target image data 422 to the second discriminator 54. The output of the second discriminator 54 indicates the result of determining the acceptability of the product R. Therefore, the inspection device 4 determines the acceptability of the product R in the target image data 422 based on the output obtained from the second discriminator 54.

As described above, in the embodiment, the learning data generation device 1 can mass-produce the second image data 125 serving as a candidate for learning data by applying the predetermined conversion processing to the first image data 122, and thus a sufficient number of pieces of learning data sets can be prepared at low cost. In addition, it is possible to prevent the second image data 125 that is inappropriate as learning data for acquiring the ability to determine the acceptability of a product from being used in the machine learning based on the result of the determination performed by the first discriminator 51. Therefore, according to the embodiment, it is possible to prepare, at low cost, a sufficient number of pieces of appropriate learning data sets used in machine learning for acquiring the ability to determine the acceptability of a product. Thereby, by performing machine learning using the prepared sufficient number of pieces of learning data sets in the second learning device 3, the second discriminator 54 having relatively high precision of determining the acceptability of a product can be constructed. Consequently, according to the embodiment, it is possible to generate the second discriminator 54 having relatively high acceptability determination precision at low cost.

Besides, the product R to be subjected to visual inspection may not be particularly limited and may be appropriately selected according to the embodiment. The product R may be, for example, a product transported on a production line for electronic parts, automobile parts, and the like. The electronic parts are, for example, substrates, chip capacitors, liquid crystals, relay windings, and the like. The automobile parts are, for example, connecting rods, shafts, engine blocks, power window switches, panels, and the like. In addition, the acceptability determination may be simple determination on whether the product R has defects, or may include, in addition to the determination on whether the product R has defects, discrimination for the type of the defects. The defects are, for example, scratches, dirt, cracks, dents, dust, burrs, color unevenness, and the like.

§ 2 Configuration Example

Figure 2:
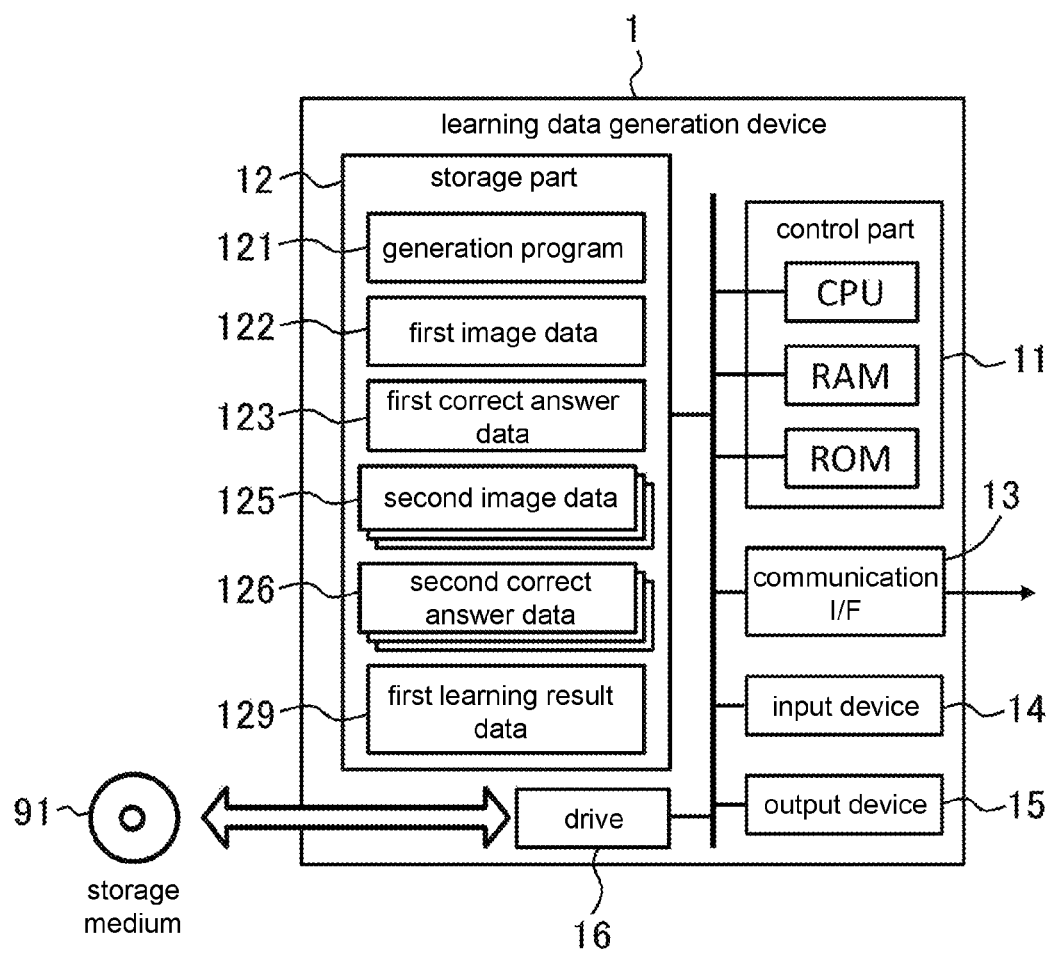
FIG. 2 schematically illustrates an example of the hardware configuration of a learning data generation device according to an embodiment.

[Hardware Configuration]
<Learning Data Generation Device>
Next, an example of the hardware configuration of the learning data generation device 1 according to the embodiment is described with reference to FIG. 2. FIG. 2 schematically illustrates an example of the hardware configuration of the learning data generation device 1 according to the embodiment.

As shown in FIG. 2, the learning data generation device 1 according to the embodiment is a computer in which a control part 11, a storage part 12, a communication interface 13, an input device 14, an output device 15, and a drive 16 are electrically connected. Besides, in FIG. 2, the communication interface is described as "communication I/F".

The control part 11 includes a CPU (Central Processing Unit) that is a hardware processor, a RAM (Random Access Memory), a ROM (Read Only Memory), and the like, and is configured to execute information processing based on a program and various data. The storage part 12 is an example of the memory and is configured by, for example, a hard disk drive, a solid state drive, and the like. In the embodiment, the storage part 12 stores various information such as a generation program 121, the first image data 122, the first correct answer data 123, the second image data 125, the second correct answer data 126, and first learning result data 129.

The generation program 121 is a program for causing the learning data generation device 1 to execute information processing described later (FIG. 10) in which plural pieces of second image data 125 that can be used in machine learning for acquiring the ability to determine the acceptability of a product are generated from the first image data 122. The generation program 121 includes a series of instructions for the information processing. The first image data 122 is image data from which the second image data 125 is generated. The first correct answer data 123 indicates the correct answer for the acceptability determination of the product in the first image data 122. Each piece of the second image data 125 is generated from the first image data 122. Each piece of second correct answer data 126 indicates the correct answer for the acceptability determination of the product in each piece of the second image data 125. The first learning result data 129 is data for setting the first discriminator 51. Details are described later.

The communication interface 13 is, for example, a wired LAN (Local Area Network) module, a wireless LAN module, or the like, and is an interface for performing wired or wireless communication via a network. The learning data generation device 1 can use the communication interface 13 to perform data communication via the network with another information processing device (for example, the first learning device 2, the second learning device 3).

The input device 14 is, for example, a device for input, such as a mouse and a keyboard. In addition, the output device 15 is, for example, a device for output, such as a display and a speaker. The operator can use the input device 14 and the output device 15 to operate the learning data generation device 1.

The drive 16 is, for example, a CD drive, a DVD drive, or the like, and is a drive device for reading a program stored in a storage medium 91. The type of the drive 16 may be appropriately selected according to the type of the storage medium 91. At least one of the generation program 121, the first image data 122, the first correct answer data 123, and the first learning result data 129 may be stored in the storage medium 91.

The storage medium 91 is a medium that accumulates information such as a recorded program by electrical, magnetic, optical, mechanical, or chemical action so that a computer and other devices, machines can read the information such as a program. The learning data generation device 1 may acquire, from the storage medium 91, at least one of the generation program 121, the first image data 122, the first correct answer data 123, and the first learning result data 129.

Here, in FIG. 2, a disk-type storage medium such as a CD or a DVD is illustrated as an example of the storage medium 91. However, the type of the storage medium 91 is not limited to the disk type, and may be a type other than the disk type. The storage medium other than the disk type may be, for example, a semiconductor memory such as a flash memory.

Besides, regarding the specific hardware configuration of the learning data generation device 1, omission, replacement, and addition of the constituent elements can be appropriately made according to the embodiment. For example, the control part 11 may include a plurality of hardware processors. The hardware processor may be configured by a microprocessor, a FPGA (field-programmable gate array), a DSP (digital signal processor), and the like. The storage part 12 may be configured by a RAM and a ROM included in the control part 11. At least one of the communication interface 13, the input device 14, the output device 15, and the drive 16 may be omitted. The learning data generation device 1 may be configured by a plurality of computers. In this case, the hardware configurations of the computers may match each other or may not. In addition, the learning data generation device 1 may be, in addition to an information processing device designed exclusively for the provided service, a general-purpose server device, a PC (Personal Computer), or the like.

Figure 3:
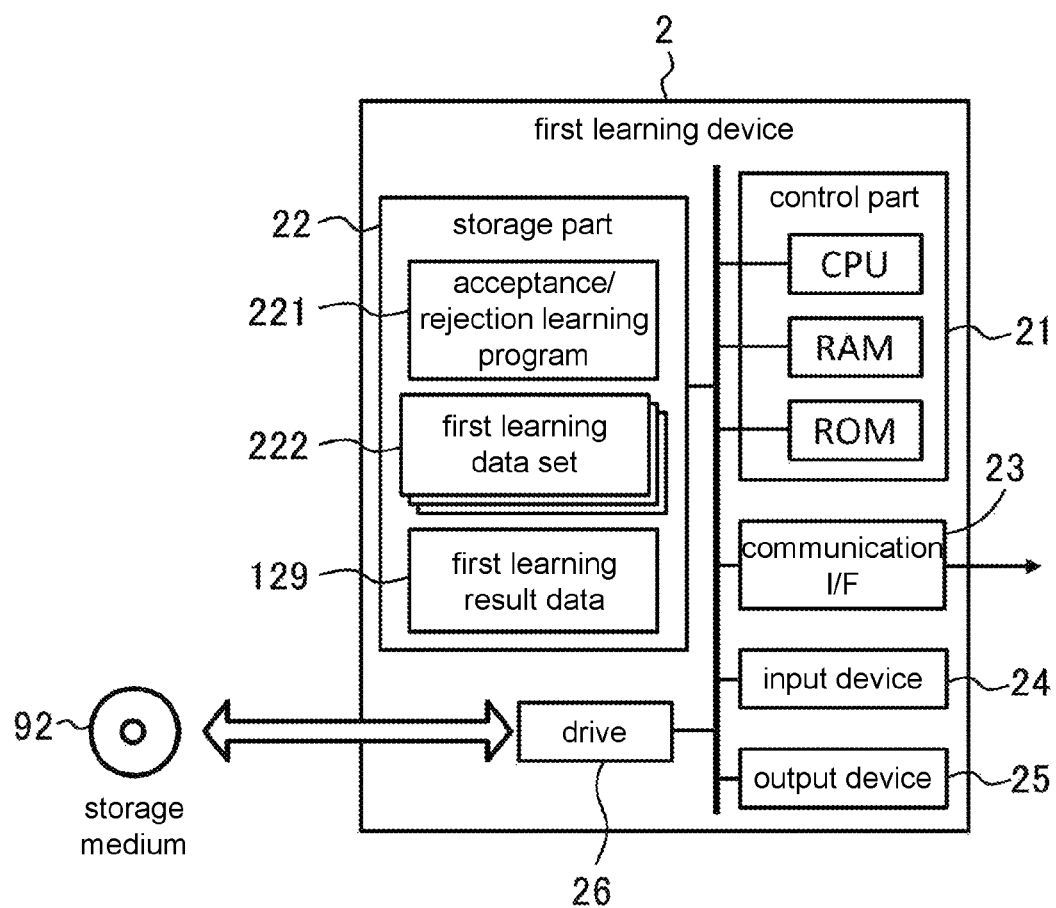
FIG. 3 schematically illustrates an example of the hardware configuration of a first learning device according to the embodiment.

<First Learning Device>
Next, an example of the hardware configuration of the first learning device 2 according to the embodiment is described with reference to FIG. 3. FIG. 3 schematically illustrates an example of the hardware configuration of the first learning device 2 according to the embodiment.

As shown in FIG. 3, the first learning device 2 according to the embodiment is a computer in which a control part 21, a storage part 22, a communication interface 23, an input device 24, an output device 25, and a drive 26 are electrically connected. Besides, in FIG. 3, the communication interface is described as "communication I/F" as in FIG. 2.

The control part 21 to the drive 26 of the first learning device 2 may be respectively configured in the same manner as the control part 11 to the drive 16 of the learning data generation device 1. That is, the control part 21 includes a CPU that is a hardware processor, a RAM, a ROM, and the like, and is configured to execute various types information processing based on programs and data. The storage part 22 is configured by, for example, a hard disk drive, a solid state drive, and the like. The storage part 22 stores various information such as an acceptance/rejection learning program 221, a first learning data set 222, and the first learning result data 129.

The acceptance/rejection learning program 221 is a program for causing the first learning device 2 to execute machine learning information processing described later (FIG. 11) for constructing the first discriminator 51, and as a result, generating the first learning result data 129. The acceptance/rejection learning program 221 includes a series of instructions for the information processing. The first learning data set 222 is used for machine learning of the first discriminator 51. Details are described later.

The communication interface 23 is, for example, a wired LAN module, a wireless LAN module, or the like, and is an interface for performing wired or wireless communication via a network. The first learning device 2 can use the communication interface 23 to perform data communication via the network with another information processing device (for example, the learning data generation device 1).

The input device 24 is, for example, a device for input, such as a mouse and a keyboard. In addition, the output device 25 is, for example, a device for output, such as a display and a speaker. The operator can use the input device 24 and the output device 25 to operate the first learning device 2.

The drive 26 is, for example, a CD drive, a DVD drive, or the like, and is a drive device for reading a program stored in the storage medium 92. At least one of the acceptance/rejection learning program 221 and the first learning data set 222 may be stored in the storage medium 92. In addition, the first learning device 2 may acquire, from the storage medium 92, at least one of the acceptance/rejection learning program 221 and the first learning data set 222.

Besides, regarding the specific hardware configuration of the first learning device 2, omission, replacement, and addition of the constituent elements can be appropriately made according to the embodiment. For example, the control part 21 may include a plurality of hardware processors. The hardware processor may be configured by a microprocessor, a FPGA, a DSP, and the like. The storage part 22 may be configured by a RAM and a ROM included in the control part 21. At least one of the communication interface 23, the input device 24, the output device 25, and the drive 26 may be omitted. The first learning device 2 may be configured by a plurality of computers. In this case, the hardware configurations of the computers may match each other or may not. In addition, the first learning device 2 may be, in addition to an information processing device designed exclusively for the provided service, a general-purpose server device, a general-purpose PC, or the like.

<Second Learning Device>

Figure 4:
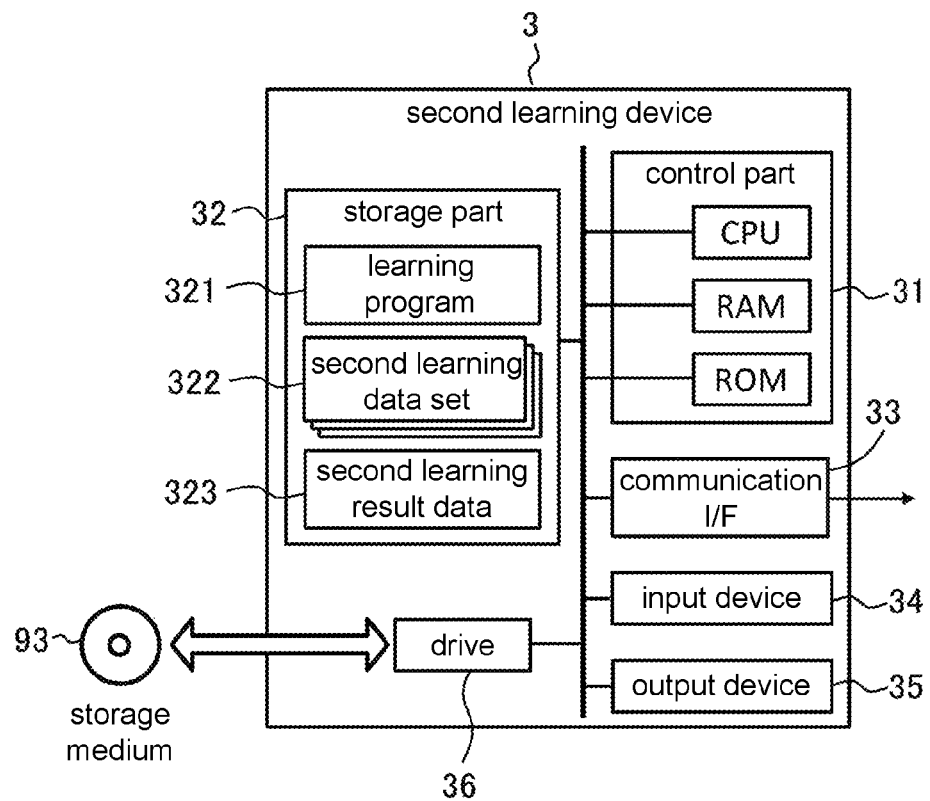
FIG. 4 schematically illustrates an example of the hardware configuration of a second learning device according to the embodiment.

Next, an example of the hardware configuration of the second learning device 3 according to the embodiment is described with reference to FIG. 4. FIG. 4 schematically illustrates an example of the hardware configuration of the second learning device 3 according to the embodiment.

As shown in FIG. 4, the second learning device 3 according to the embodiment is a computer in which a control part 31, a storage part 32, a communication interface 33, an input device 34, an output device 35, and a drive 36 are electrically connected. Besides, in FIG. 4, the communication interface is described as "communication I/F" as in FIG. 2.

The control part 31 to the drive 36 of the second learning device 3 may be respectively configured in the same manner as the control part 11 to the drive 16 of the learning data generation device 1. That is, the control part 31 includes a CPU that is a hardware processor, a RAM, a ROM, and the like, and is configured to execute various types of information processing based on programs and data. The storage part 32 is configured by, for example, a hard disk drive, a solid state drive, and the like. The storage part 32 stores various information such as a learning program 321, a second learning data set 322, and second learning result data 323.

The learning program 321 is a program for causing the second learning device 3 to execute machine learning information processing described later (FIG. 12) for constructing the second discriminator 54, and as a result, generating the second learning result data 323. The learning program 321 includes a series of instructions for the information processing. The second learning data set 322 is used for machine learning of the second discriminator 54. Details are described later.

The communication interface 33 is, for example, a wired LAN module, a wireless LAN module, or the like, and is an interface for performing wired or wireless communication via a network. The second learning device 3 can use the communication interface 33 to perform data communication via the network with another information processing device (for example, the learning data generation device 1, the inspection device 4).

The input device 34 is, for example, a device for input, such as a mouse and a keyboard. The output device 35 is, for example, a device for output, such as a display and a speaker. The operator can use the input device 34 and the output device 35 to operate the second learning device 3.

The drive 36 is, for example, a CD drive, a DVD drive, or the like, and is a drive device for reading a program stored in the storage medium 93. At least one of the learning program 321 and the second learning data set 322 may be stored in the storage medium 93. In addition, the second learning device 3 may acquire, from the storage medium 93, at least one of the learning program 321 and the second learning data set 322.

Besides, regarding the specific hardware configuration of the second learning device 3, omission, replacement, and addition of the constituent elements can be appropriately made according to the embodiment. For example, the control part 31 may include a plurality of hardware processors. The hardware processor may be configured by a microprocessor, a FPGA, a DSP, and the like. The storage part 32 may be configured by a RAM and a ROM included in the control part 31. At least one of the communication interface 33, the input device 34, the output device 35, and the drive 36 may be omitted. The second learning device 3 may be configured by a plurality of computers. In this case, the hardware configurations of the computers may match each other or may not. The second learning device 3 may be, in addition to an information processing device designed exclusively for the provided service, a general-purpose server device, a general-purpose PC, or the like.

<Inspection Device>

Figure 5:
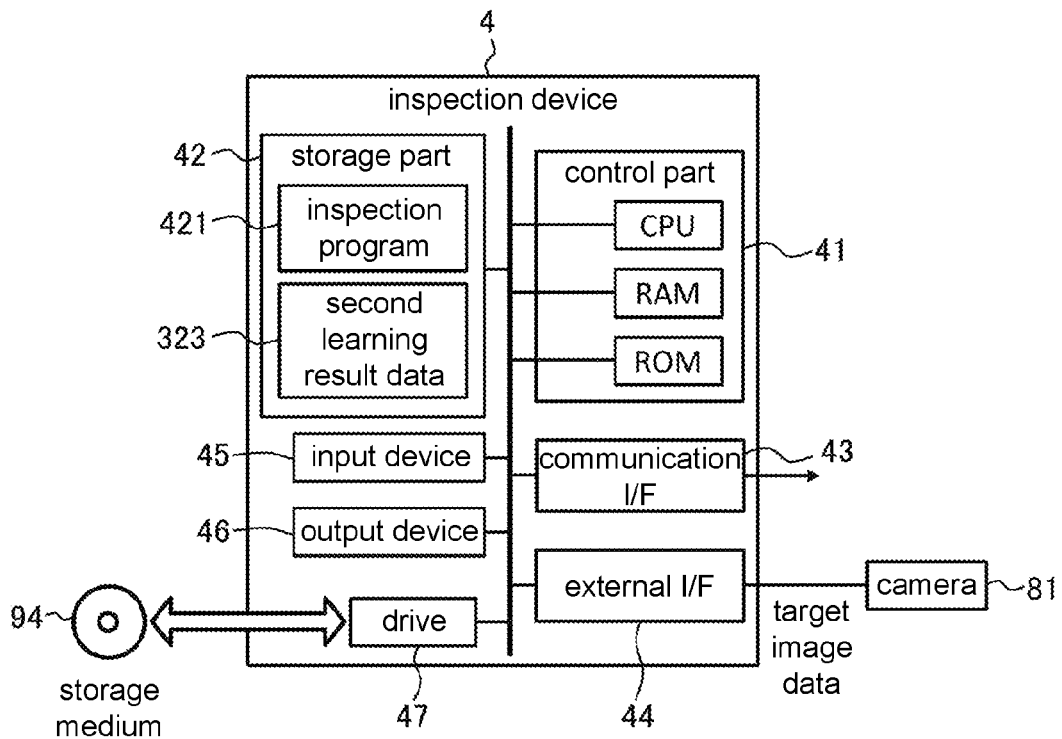
FIG. 5 schematically illustrates an example of the hardware configuration of an inspection device according to the embodiment.

Next, an example of the hardware configuration of the inspection device 4 according to the embodiment is described with reference to FIG. 5. FIG. 5 schematically illustrates an example of the hardware configuration of the inspection device 4 according to the embodiment.

As shown in FIG. 5, the inspection device 4 according to the embodiment is a computer in which a control part 41, a storage part 42, a communication interface 43, an external interface 44, an input device 45, an output device 46, and a drive 47 are electrically connected. In FIG. 5, the communication interface and the external interface are respectively described as "communication I/F" and "external I/F".

The control part 41 to the communication interface 43 and the input device 45 to the drive 47 of the inspection device 4 may be respectively configured in the same manner as the control part 11 to the drive 16 of the learning data generation device 1. That is, the control part 41 includes a CPU that is a hardware processor, a RAM, a ROM, and the like, and is configured to execute various types of information processing based on programs and data. The storage part 42 is configured by, for example, a hard disk drive, a solid state drive, and the like. The storage part 42 stores various information such as an inspection program 421 and the second learning result data 323.

The inspection program 421 is a program for causing the inspection device 4 to execute information processing described later (FIG. 13) for using the second discriminator 54 to determine the acceptability of the product R in the target image data 422. The inspection program 421 includes a series of instructions for the information processing. The second learning result data 323 is data for setting the second discriminator 54. Details are described later.

The communication interface 43 is, for example, a wired LAN module, a wireless LAN module, or the like, and is an interface for performing wired or wireless communication via a network. The inspection device 4 can use the communication interface 43 to perform data communication via the network with another information processing device (for example, the second learning device 3).

The external interface 44 is, for example, a USB (Universal Serial Bus) port, a dedicated port, or the like, and is an interface for connection with an external device. The type and number of the external interfaces 44 may be appropriately selected according to the type and number of the external devices to be connected. In the embodiment, the inspection device 4 is connected to the camera 81 via the external interface 44.

The camera 81 is used to acquire the target image data 422 by photographing the product R. The type and location of the camera 81 may not be particularly limited and may be appropriately determined according to the embodiment. As the camera 81, for example, a known camera such as a digital camera and a video camera may be used. In addition, the camera 81 may be disposed in the vicinity of the production line on which the product R is transported. Besides, when the camera 81 includes a communication interface, the inspection device 4 may be connected to the camera 81 via the communication interface 43 instead of the external interface 44.

The input device 45 is, for example, a device for input, such as a mouse and a keyboard. The output device 46 is, for example, a device for output, such as a display and a speaker. The operator can use the input device 45 and the output device 46 to operate the inspection device 4.

The drive 47 is, for example, a CD drive, a DVD drive, or the like, and is a drive device for reading a program stored in the storage medium 94. At least one of the inspection program 421 and the second learning result data 323 may be stored in the storage medium 94. In addition, the inspection device 4 may acquire, from the storage medium 94, at least one of the inspection program 421 and the second learning result data 323.

Besides, regarding the specific hardware configuration of the inspection device 4, omission, replacement, and addition of the constituent elements can be appropriately made according to the embodiment. For example, the control part 41 may include a plurality of hardware processors. The hardware processor may be configured by a microprocessor, a FPGA, a DSP and the like. The storage part 42 may be configured by a RAM and a ROM included in the control part 41. At least one of the communication interface 43, the external interface 44, the input device 45, the output device 46, and the drive 47 may be omitted. The inspection device 4 may be configured by a plurality of computers. In this case, the hardware configurations of the computers may match each other or may not. In addition, the inspection device 4 may be, in addition to an information processing device designed exclusively for the provided service, a general-purpose server device, a general-purpose desktop PC, a notebook PC, a tablet PC, a mobile phone including a smartphone, or the like.

Figure 6:
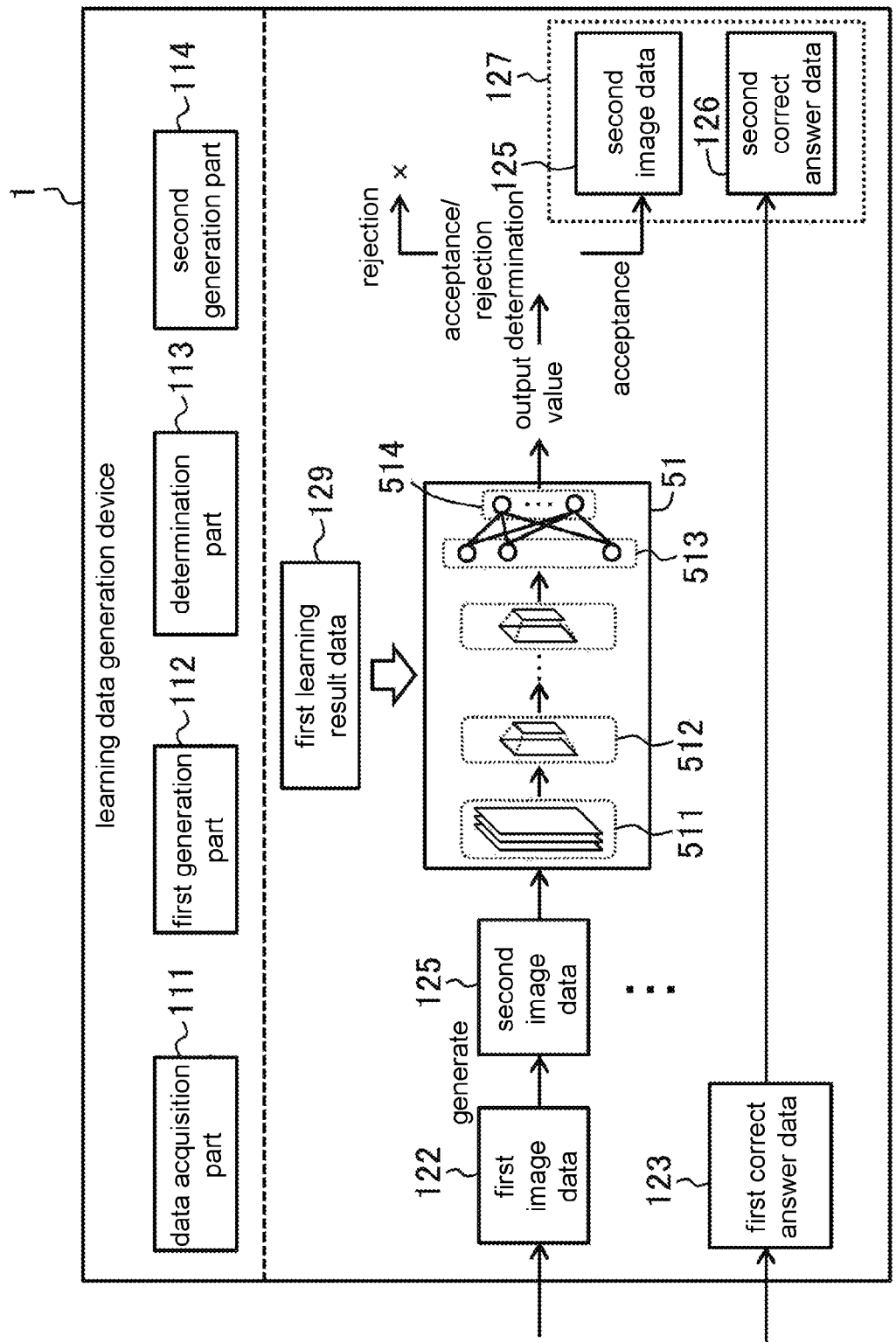
FIG. 6 schematically illustrates an example of the software configuration of the learning data generation device according to the embodiment.

[Software Configuration]
<Learning Data Generation Device>
Next, an example of the software configuration of the learning data generation device 1 according to the embodiment is described with reference to FIG. 6. FIG. 6 schematically illustrates an example of the software configuration of the learning data generation device 1 according to the embodiment.

The control part 11 of the learning data generation device 1 expands the generation program 121 stored in the storage part 12 into the RAM. Then, the control part 11 interprets and executes the instructions included in the generation program 121 expanded into the RAM by the CPU to control each constituent element. Thereby, as shown in FIG. 6, the learning data generation device 1 according to the embodiment operates as a computer which includes, as the software modules, a data acquisition part 111, a first generation part 112, a determination part 113, and a second generation part 114. That is, in the embodiment, each software module is realized by the control part 11 (CPU).

The data acquisition part 111 acquires the first image data 122 of a product, and the first correct answer data 123 indicating the correct answer for the acceptability determination of the product in the first image data 122. The first generation part 112 generates plural pieces of second image data 125 of the product respectively from the first image data 122 by applying predetermined conversion processing to the first image data 122.

The determination part 113 includes the first trained discriminator 51 having undergone machine learning for determining whether to adopt given image data as learning data.

The determination part 113 determines whether to adopt each piece of the second image data 125 as learning data based on output obtained from the first discriminator 51 by inputting each piece of the second image data 125 to the first discriminator 51.

The second generation part 114 adds the second correct answer data 126 to the second image data 125 that is determined to be adopted as learning data used in machine learning for acquiring the ability to determine the acceptability of the product. The second correct answer data 126 indicates the correct answer for the acceptability determination of the product in the second image data 125, which is determined based on the first correct answer data 123. Thereby, the second generation part 114 generates the learning data set 127 configured by a pair of the second image data 125 and the second correct answer data 126.

(Discriminator)
Next, the configuration of the first discriminator 51 is described. As shown in FIG. 6, the first discriminator 51 is configured by a neural network. Specifically, the first discriminator 51 is configured by a so-called convolutional neural network and includes a convolutional layer 511, a pooling layer 512, a fully-coupled layer 513, and an output layer 514.

The convolutional neural network is a forward-propagation neural network having a structure in which convolutional layers and pooling layers are alternately connected. In the first discriminator 51 according to the embodiment, a plurality of convolutional layers 511 and a plurality of pooling layers 512 are alternately disposed on the input side. Then, the output of the pooling layer 512 disposed closest to the output side is input to the full-coupled layer 513, and the output of the full-coupled layer 513 is input to the output layer 514.

The convolution layer 511 is a layer in which calculation of an image convolution is performed. The image convolution corresponds to processing for calculating the correlation between an image and a predetermined filter. Therefore, by performing the image convolution, for example, a light and shade pattern similar to the light and shade pattern of the filter can be detected from the input image.

The pooling layer 512 is a layer in which pooling processing is performed. The pooling processing discards a part of the information on a position of the image in which the response to the filter is strong, and realizes the invariance of the response to the minute position change of the characteristic appearing in the image.

The fully-coupled layer 513 is a layer in which all neurons between adjacent layers are coupled. That is, each neuron included in the fully-coupled layer 513 is coupled to all neurons included in the adjacent layer. The fully-coupled layer 513 may be configured by two or more layers. In addition, the number of the neurons included in the fully-coupled layer 513 may be appropriately set according to the embodiment.

The output layer 514 is a layer disposed closest to the output side of the first discriminator 51. The number of the neurons included in the output layer 514 may be appropriately set according to an output format of the result of determining whether to adopt image data as learning data. Besides, the configuration of the first discriminator 51 may not be limited to this example and may be appropriately set according to the embodiment.

A threshold value is set for each neuron included in each of the layers 511-514, and basically, the output of each neuron is determined depending on whether the sum of products of each input and each weight exceeds the threshold value. The determination part 113 inputs the second image data 125 to the convolutional layer 511 disposed closest to the input side of the first discriminator 51, and performs ignition determination of each neuron included in each layer in order from the input side. Thereby, the determination part 113 acquires, from the output layer 514, an output value corresponding to the result of determining whether to adopt the input second image data 125 as learning data.

Besides, information indicating the configuration of the first discriminator 51 (the number of the layers of the neural network, the number of the neurons in each layer, the coupling relationship between the neurons, the transfer function of each neuron), the coupling weight between the neurons, and the threshold value of each neuron is included in the first learning result data 129. The determination part 113 refers to the first learning result data 129 to set the first trained discriminator 51.

<First Learning Device>

Figure 7:
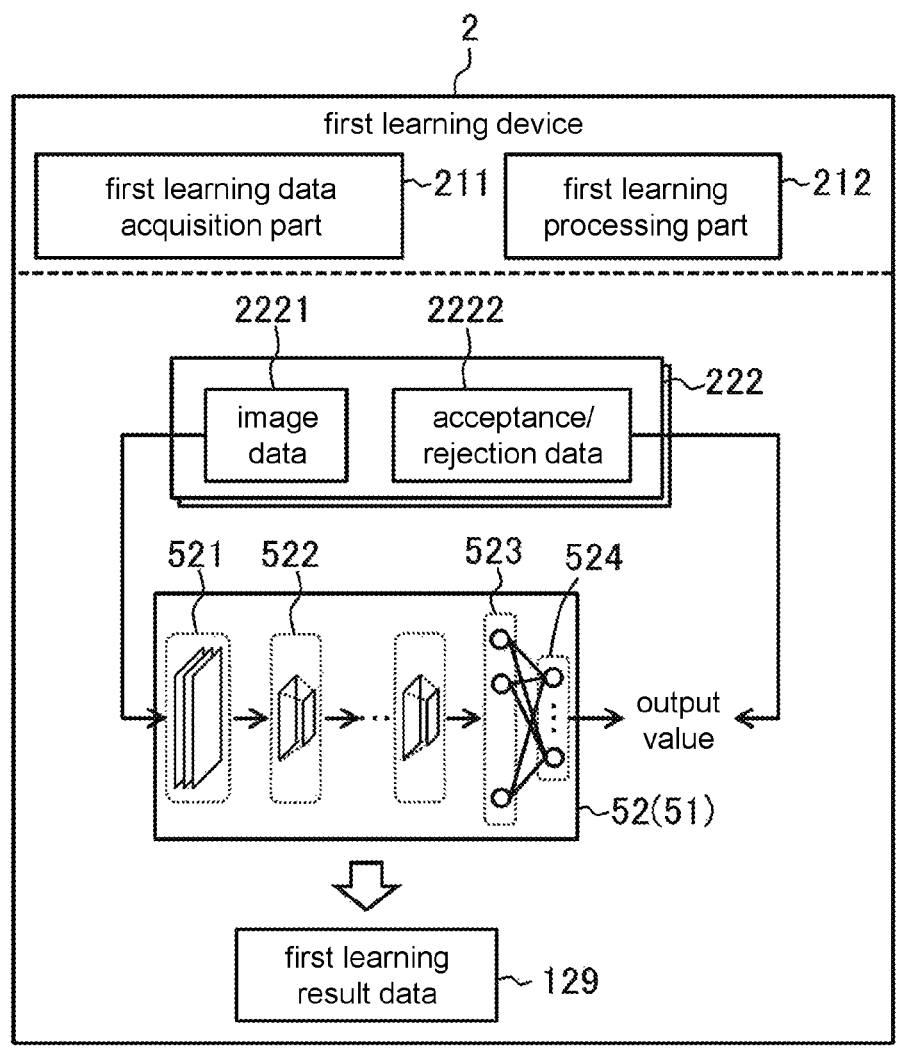
FIG. 7 schematically illustrates an example of the software configuration of the first learning device according to the embodiment.

Next, an example of the software configuration of the first learning device 2 according to the embodiment is described with reference to FIG. 7. FIG. 7 schematically illustrates an example of the software configuration of the first learning device 2 according to the embodiment.

The control part 21 of the first learning device 2 expands the acceptance/rejection learning program 221 stored in the storage part 22 into the RAM. Then, the control part 21 interprets and executes the instructions included in the acceptance/rejection learning program 221 expanded into the RAM to control each constituent element. Thereby, as shown in FIG. 7, the first learning device 2 according to the embodiment is configured as a computer which includes a first learning data acquisition part 211 and a first learning processing part 212 as the software modules. That is, in the embodiment, each software module is realized by the control part 21 (CPU).

The first learning data acquisition part 211 acquires plural pieces of first learning data sets 222 respectively configured by a combination of image data 2221 of a product that can be captured and acceptance/rejection data 2222 indicating the correct answer for the determination on whether to adopt the image data 2221 as learning data. The image data 2221 is used as learning data (training data) for acceptance/ rejection determination, and the acceptance/rejection data 2222 is used as teacher data (correct answer data). The image data 2221 is an example of the "fifth image data" of the present invention. The acceptance/rejection data 2222 is an example of the "third correct answer data" of the present invention.

The first learning processing part 212 uses each piece of the acquired first learning data sets 222 to execute machine learning of the neural network 52. That is, the first learning processing part 212 performs the learning processing of the neural network 52 to output an output value corresponding to the acceptance/rejection data 2222 when the image data 2221 is input.

The neural network 52 is a learning model serving as a learning target, and is the first discriminator 51 before learning. The neural network 52 is configured in the same manner as the first discriminator 51. That is, the neural network 52 includes a convolutional layer 521, a pooling layer 522, a fully-coupled layer 523, and an output layer 524. The layers 521-524 are configured in the same manner as the layers 511-514 of the first discriminator 51.

When the image data 2221 is input to the convolutional layer 521 disposed closest to the input side, the first learning processing part 212 trains the neural network 52 so as to output the output value corresponding to the acceptance/ rejection data 2222 from the output layer 524 by the learning processing of the neural network. Thereby, the first learning processing part 212 can construct the first trained discriminator 51 that has acquired the ability to determine whether to adopt given image data as learning data. The first learning processing part 212 stores, in the storage part 22, information indicating the configuration of the neural network 52 after learning (that is, the first discriminator 51), the coupling weight between the neurons, and the threshold value of each neuron as the first learning result data 129.

<Second Learning Device>

Figure 8:
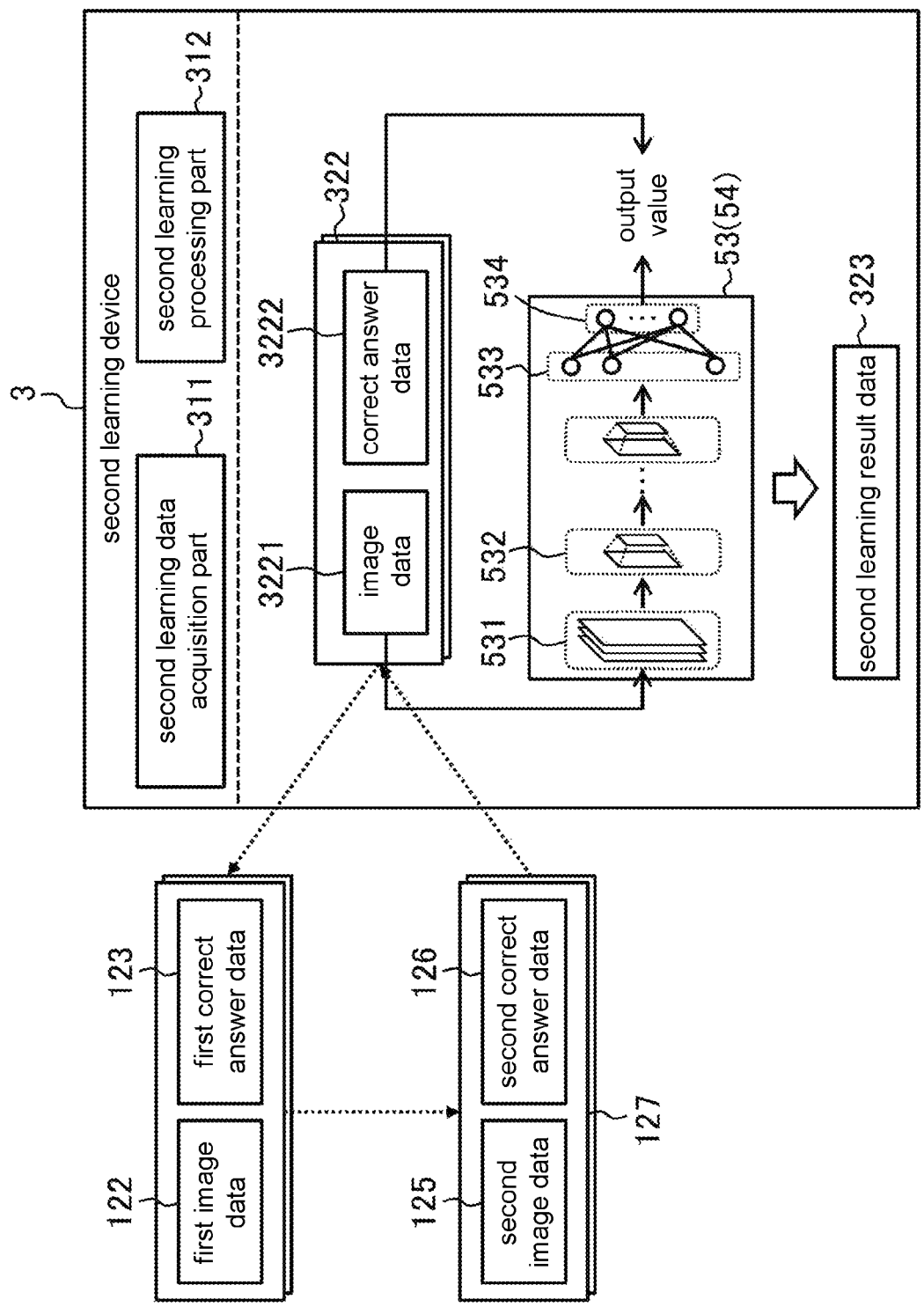
FIG. 8 schematically illustrates an example of the software configuration of the second learning device according to the embodiment.

Next, an example of the software configuration of the second learning device 3 according to the embodiment is described with reference to FIG. 8. FIG. 8 schematically illustrates an example of the software configuration of the second learning device 3 according to the embodiment.

The control part 31 of the second learning device 3 expands the learning program 321 stored in the storage part 32 into the RAM. Then, the control part 31 interprets and executes the instructions included in the learning program 321 expanded into the RAM by the CPU to control each constituent element. Thereby, as shown in FIG. 8, the second learning device 3 according to the embodiment is configured as a computer which includes, as the software modules, a second learning data acquisition part 311 and a second learning processing part 312. That is, in the embodiment, each software module is realized by the control part 31 (CPU).

The second learning data acquisition part 311 acquires plural pieces of second learning data sets 322 respectively configured by a combination of image data 3221 of a product and correct answer data 3222 indicating the correct answer for the acceptability determination of the product in the image data 3221. The image data 3221 is used as learning data (training data) for the acceptability determination of the product, and the correct answer data 3222 is used as teacher data.

The plural pieces of second learning data sets 322 include the learning data set 127 generated by the learning data generation device 1. That is, the image data 3221 of at least a part of the second learning data sets 322 is the second image data 125, and the correct answer data 3222 is the second correct answer data 126. In addition, the combination (data set) of the first image data 122 and the first correct answer data 123 from which the learning data set 127 is generated may be the second learning data set 322 selected from the plural pieces of second learning data sets 322.

Besides, the second learning data acquisition part 311 may transmit the second learning data sets 322 to the learning data generation device 1 as a mass production source data set (the first image data 122 and the first correct answer data 123), and generate plural pieces of learning data sets 127. Thereby, the second learning data acquisition part 311 can increase the number of pieces of the second learning data sets 322 used for machine learning by receiving the plural pieces of generated learning data sets 127 as the second learning data sets 322.

The second learning processing part 312 uses each piece of the acquired second learning data sets 322 to execute machine learning of the neural network 53. That is, the second learning processing part 312 performs the learning processing of the neural network 53 so as to output an output value corresponding to the correct answer data 3222 when the image data 3221 is input. The second learning processing part 312 is an example of the "learning processing part" of the present invention.

The neural network 53 is a learning model serving a learning target, and is the second discriminator 54 before learning. In the embodiment, the neural network 53 (and the second discriminator 54) is a so-called convolutional neural network. The neural network 53 may be configured in the same manner as the first discriminator 51. That is, the neural network 53 includes a convolutional layer 531, a pooling layer 532, a fully-coupled layer 533, and an output layer 534. The layers 531-534 may be configured in the same manner as the layers 511-514 of the first discriminator 51. However, the structure of the neural network 53 may not match the first discriminator 51. For example, the number of the layers of the neural network 53, the number of the neurons in each layer, and the coupling relationship between the neurons may be different from those of the first discriminator 51.

When the image data 3221 is input to the convolutional layer 531 disposed closest to the input side, the second learning processing part 312 trains the neural network 53 so as to output the output value corresponding to the correct answer data 3222 from the output layer 534 by the learning processing of the neural network. Thereby, the second learning processing part 312 can construct the second trained discriminator 54 that has acquired the ability to determine the acceptability of the product in the target image data. The second learning processing part 312 stores, in the storage part 32, information indicating the configuration of the neural network 53 after learning (that is, the second discriminator 54), the coupling weight between the neurons, and the threshold value of each neuron as the second learning result data 323.

Figure 9:
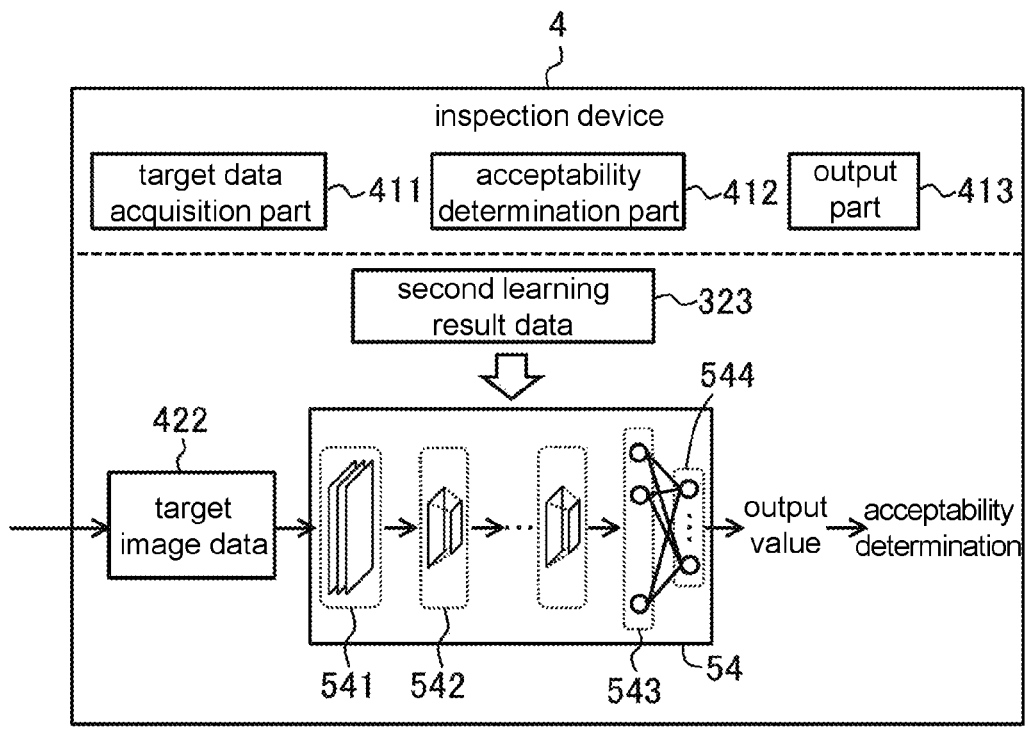
FIG. 9 schematically illustrates an example of the software configuration of the inspection device according to the embodiment.

<Inspection Device>
Next, an example of the software configuration of the inspection device 4 according to the embodiment is described with reference to FIG. 9. FIG. 9 schematically illustrates an example of the software configuration of the inspection device 4 according to the embodiment.

The control part 41 of the inspection device 4 expands the inspection program 421 stored in the storage part 42 into the RAM. Then, the control part 41 interprets and executes the instructions included in the inspection program 421 expanded into the RAM by the CPU to control each constituent element. Thereby, as shown in FIG. 9, the inspection device 4 according to the embodiment is configured as a computer which includes, as the software modules, a target data acquisition part 411, an acceptability determination part 412, and an output part 413. That is, in the embodiment, each software module is realized by the control part 41 (CPU).

The target data acquisition part 411 acquires the target image data 422 of the product R to be inspected. In the embodiment, the target data acquisition part 411 acquires the target image data 422 by photographing the product R with the camera 81. The acceptability determination part 412 includes the second trained discriminator 54 that has acquired the ability to determine the acceptability of the product in the target image data. The acceptability determination part 412 uses the second discriminator 54 to determine the acceptability of the product R in the target image data 422.

Specifically, the acceptability determination part 412 refers to the second learning result data 323 to set the second trained discriminator 54. Next, the acceptability determination part 412 acquires an output value from the second discriminator 54 by inputting the acquired target image data 422 to the second discriminator 54 and executing calculation processing of the second discriminator 54. Then, the acceptability determination part 412 determines the acceptability of the product R in the target image data 422 based on the output value acquired from the second discriminator 54. The output part 413 outputs the result of determining the acceptability of the product R, that is, the result of visual inspection.

Besides, as described above, the second discriminator 54 according to the embodiment is configured by a so-called convolutional neural network, and is configured in the same manner as the neural network 53. That is, the second discriminator 54 includes a convolutional layer 541, a pooling layer 542, a fully-coupled layer 543, and an output layer 534. The layers 541-544 are configured in the same manner as the layers 531-534 of the neural network 53.

<Others>
Each software module of the learning data generation device 1, the first learning device 2, the second learning device 3, and the inspection device 4 is described in detail in an operation example described later. Besides, in the embodiment, an example is described in which each software module of the learning data generation device 1, the first learning device 2, the second learning device 3, and the inspection device 4 is realized by a general-purpose CPU. However, a part or all of the above software modules may be realized by one or more dedicated processors. In addition, regarding the software configurations of the learning data generation device 1, the first learning device 2, the second learning device 3, and the inspection device 4, omission, replacement, and addition of the software modules may be appropriately made according to the embodiment.

§ 3 Operation Example

Figure 10:
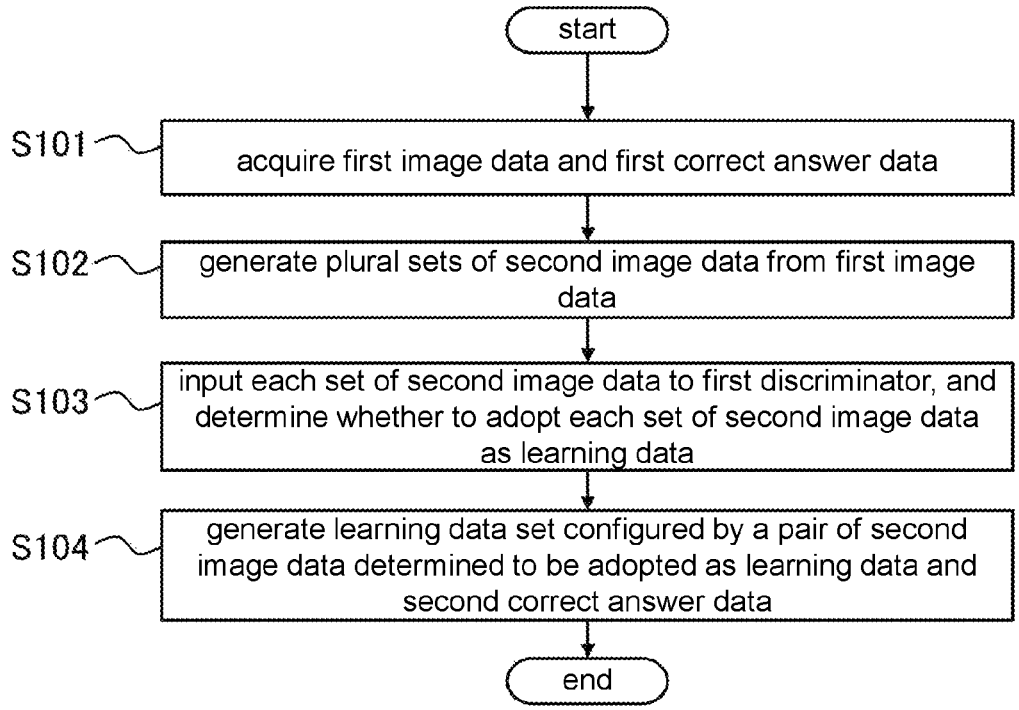
FIG. 10 illustrates an example of the processing procedure of the learning data generation device according to the embodiment.

[First Learning Data Generation Device]
Next, an operation example of the learning data generation device 1 according to the embodiment is described with reference to FIG. 10. FIG. 10 is a flowchart illustrating an example of the processing procedure of the learning data generation device 1 according to the embodiment. The processing procedure described below is an example of the learning data generation method. However, the processing procedure described below is merely an example, and each processing may be changed as much as possible. In addition, regarding the processing procedure described below, steps can be omitted, replaced, and added appropriately according to the embodiment.

(Step S101)

In step S101, the control part 11 operates as the data acquisition part 111 and acquires the first image data 122 and the first correct answer data 123 indicating the correct answer for the acceptability determination of the product in the first image data 122.

The method for acquiring the first image data 122 and the first correct answer data 123 may not be particularly limited and may be appropriately determined according to the embodiment. For example, a camera is prepared, and a product which is the same type as the product R to be inspected and has a defect or no defect is photographed by the prepared camera. Thereby, the first image data 122 of the product in which the acceptability appears can be acquired. Then, with respect to the obtained first image data 122, the first correct answer data 123 indicating the acceptability (correct answer) appearing in the product in the first image data 122 is acquired appropriately. Thereby, a combination (data set) of the first image data 122 and the first correct answer data 123 can be created.

The creation of the combination of the first image data 122 and the first correct answer data 123 may be performed by the learning data generation device 1. In this case, the control part 11 may create the combination of the first image data 122 and the first correct answer data 123 according to the operation of the input device 14 performed by the operator. In addition, the control part 11 may automatically create the combination of the first image data 122 and the first correct answer data 123 by the processing of the generation program 121. By executing this creation processing, in step S101, the control part 11 can acquire the combination of the first image data 122 and the first correct answer data 123.

Alternatively, the combination of the first image data 122 and the first correct answer data 123 may be created by, for example, an information processing device other than the learning data generation device 1, such as the second learning device 3. In another information processing device, the combination of the first image data 122 and the first correct answer data 123 may be manually created by the operator or automatically created by the processing of programs. In this case, in step S101, the control part 11 may acquire the combination of the first image data 122 and the first correct answer data 123 created by another information processing device via a network, the storage medium 91, or the like.

In addition, in this case, the combination of the first image data 122 and the first correct answer data 123 may be a second learning data set 322 selected from the plural pieces of second learning data sets 322 used in the second learning device 3. The plural pieces of second learning data sets 322 may be stored in the storage part 22 of the second learning device 3 or may be stored in an external storage device such as a NAS (Network Attached Storage). In this case, in step S101, the control part 11 can acquire, from a storage region such as the second learning device 3 or the external storage device, the combination of the first image data 122 and the first correct answer data 123 via a network, the storage medium 91, or the like.

When the acquisition of the combination (data set) of the first image data 122 and the first correct answer data 123 is completed, the control part 11 advances the processing to the next step S102. Besides, in step S101, a plurality of data sets may be acquired. When the plural pieces of data sets are acquired, the control part 11 executes the following steps S102 to S104 for each piece of the data sets.

(Step S102)

In step S102, the control part 11 operates as the first generation part 112 and applies predetermined conversion processing to the first image data 122 acquired in step S101. Thereby, the control part 11 generates plural pieces of second image data 125 of the product respectively from the first image data 122.

The predetermined conversion processing may be appropriately selected according to the embodiment. For example, the predetermined conversion processing may be selected from photometric conversion processing, geometric conversion processing, image synthesis processing, image replacement processing, and a combination thereof. Besides, the photometric conversion processing is processing for converting brightness such as image brightness, which is, for example, brightness conversion processing or the like. The brightness conversion processing is processing for changing the pixel values of at least a part of the first image data 122. The geometric conversion processing is processing for converting image spatial coordinates, which is, for example, an affine conversion, a projective conversion, or the like. The affine conversion is processing that can linearly convert and translate at least a part of the first image data 122. The image synthesis is to synthesize a predetermined image such as noise in at least a part of the first image data 122. The image replacement is to replace at least a part of the first image data 122 with another image. A converter constructed by machine learning may be used for these conversion processing.

By these conversion processing, the second image data 125 that does not completely match the first image data 122 can be generated from the first image data 122. The control part 11 repeatedly applies the conversion processing to the first image data 122 while appropriately changing the parameters of the conversion processing (for example, the amount of lightness to be converted, each value of the conversion matrix of the affine conversion, and the like). The values of the parameters of the conversion processing may be given in advance by a plurality of templates, or may be changed appropriately at random or according to a predetermined rule.

Thereby, the control part 11 can generate plural pieces of second image data 125 respectively different from each other. The number of pieces of the generated second image data 125 may be appropriately determined according to the embodiment. Each piece of the generated second image data 125 is a candidate for learning data used in machine learning for acquiring the ability to determine the acceptability of a product. When the generation of the plural pieces of second image data 125 is completed, the control part 11 advances the processing to the next step S103.

(Step S103)

In step S103, the control part 11 operates as the determination part 113 and determines, based on output obtained from the first discriminator 51 by inputting each piece of the second image data 125 generated in step S102 to the first discriminator 51, whether to adopt each piece of the second image data 125 as learning data.

In the embodiment, the control part 11 refers to the first learning result data 129 to set the first trained discriminator 51. Subsequently, the control part 11 inputs each piece of the second image data 125 to the first discriminator 51, and executes the calculation processing of the first discriminator 51. Thereby, the control part 11 acquires the output value from the first discriminator 51.

Specifically, the control part 11 inputs each piece of the second image data 125 generated in step S102 to the convolutional layer 511 disposed closest to the input side of the first discriminator 51. Then, the control part 11 performs ignition determination of each neuron included in each of the layers 511-514 in order from the input side. Thereby, the control part 11 acquires, from the output layer 514, an output value corresponding to the result of determining whether to adopt each piece of the second image data 125 as learning data.

Then, the control part 11 determines whether to adopt each piece of the second image data 125 as learning data based on the output value acquired from the output layer 514. Here, the format of the output value obtained from the output layer 514 may be appropriately selected according to the embodiment. For example, the output value obtained from the output layer 514 may indicate whether to adopt each piece of the second image data 125 as learning data by a binary value. In this case, the control part 11 can specify whether to adopt the target second image data 125 as learning data according to the output value obtained from the output layer 514. In addition, for example, the output value obtained from the output layer 514 may indicate the degree of being appropriate or inappropriate as learning data by a continuous value. In this case, the control part 11 can determine whether to adopt the target second image data 125 as learning data by comparing the output value obtained from the output layer 514 with a threshold value. Thereby, when the determination on whether to adopt each case of second image data 125 as learning data is completed, the control part 11 advances the processing to the next step S104.

(Step S104)

In step S104, the control part 11 operates as the second generation part 114, and adds the correct answer data 126 to the second image data 125 determined to be adopted as learning data used in machine learning for acquiring the ability to determine the acceptability of a product.

The second correct answer data 126 is appropriately set to indicate the correct answer for the acceptability determination of the product in the second image data 125. In the embodiment, the correct answer indicated by the second correct answer data 126 is determined based on the first correct answer data 123. For example, even if the conversion processing in step S102 is applied, the control part 11 may directly use the first correct answer data 123 as the second correct answer data 126 when there is no change in the acceptability state that appears in the product.

In addition, for example, each correct answer data (123, 126) may indicate the acceptability of the product by a value that can be changed by the predetermined conversion processing, such as indicating a defective location. In this case, the control part 11 may derive the value of the second correct answer data 126 by applying the predetermined conversion processing to the value of the first correct answer data 123.

In addition, depending on the conversion processing applied in step S102, for example, as the image of the defective location is overwritten with an image having no defect, the acceptability state appearing in the product may be change (for example, switch) between the first image data 122 and the second image data 125. In this case, the control part 11 may determine whether the correct answer indicated by the first correct answer data 123 changes based on the predetermined conversion processing applied in step S102, and determine the content of the second correct answer data 126 based on the result of the determination.

As described above, the control part 11 can generate the learning data set 127 configured by a pair of the second image data 125 of a product and the second correct answer data 126 indicating the correct answer for the acceptability determination of the product in the second image data 125. The control part 11 collects plural pieces of second image data 125 determined to be adopted as learning data, and adds the second correct answer data 126 to each piece of the collected second image data 125, thereby generating a learning data group configured by plural pieces of learning data sets 127.

Besides, the form in which the second correct answer data 126 is added may be appropriately selected according to the embodiment. For example, one set of second correct data 126 may be added to one set of second image data 125. In addition, one set of second correct answer data 126 may be collectively added to the plural pieces of second image data 125 having the same correct answer for the acceptability determination of the product. In this case, the plural pieces of second image data 125 having the same correct answer may be put into one group, and thereby handled as being added with one piece of second correct answer data 126.

After the generation of the learning data sets 127 is completed, the control part 11 saves the generated learning data sets 127 in a predetermined storage region. The predetermined storage region may be the storage part 12 or an external storage area such as a NAS. In addition, the control part 11 may transmit the generated learning data sets 127 to the second learning device 3. Thereby, when the saving processing of the generated learning data sets 127 is completed, the control part 11 ends the processing according to this operation example.

Besides, the control part 11 may repeat the series of processing in steps S101 to S104 until the number of pieces of the generated learning data sets 127 exceeds a threshold value. At this time, the first image data 122 from which the second image data 125 is generated may be changed each time the series of processing is repeated, or may be commonly used in repetitions of at least a predetermined number of times. When the first image data 122 is commonly used, the processing in step S101 may be omitted.

In addition, the processing of the second image data 125 determined not to be adopted as learning data may be appropriately determined according to the embodiment. For example, the control part 11 may delete the second image data 125 determined not to be adopted as learning data. In addition, for example, when the learning data generation device 1 includes a display as the output device 15, the control part 11 may display the second image data 125 determined not to be adopted as learning data on the display. Thereby, the control part 11 may accept a selection on whether to use the second image data 125 as learning data or delete the second image data 125. In this case, the operator can select, by operating the input device 14, whether to use the second image data 125 determined not to be adopted as learning data by the first discriminator 51 as learning data or delete the second image data 125.

[First Learning Device]

Figure 11:
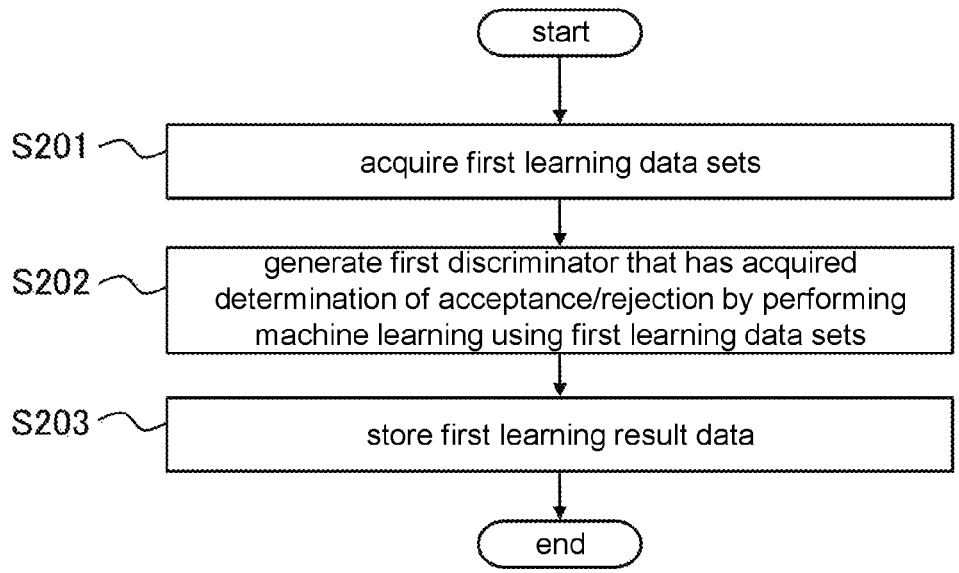
FIG. 11 illustrates an example of the processing procedure of the first learning device according to the embodiment.

Next, an operation example of the first learning device 2 according to the embodiment is described with reference to FIG. 11. FIG. 11 is a flowchart illustrating an example of the processing procedure of the first learning device 2 according to the embodiment. However, the processing procedure described below is merely an example, and each processing may be changed as much as possible. In addition, in the processing procedure described below, steps can be omitted, replaced, and added appropriately according to the embodiment.

(Step S201)

In step S201, the control part 21 operates as the first learning data acquisition part 211, and acquires plural pieces of first learning data sets 222 respectively configured by a combination of the image data 2221 and the acceptance/rejection data 2222.

The method for acquiring the first learning data sets 222 may not be particularly limited and may be appropriately determined according to the embodiment. For example, a camera is prepared, and a product which is the same type as the product R to be inspected and has a defect or no defect is photographed by the prepared camera. The captured image data obtained in this manner may be used as the image data 2221. In addition, the image data 3221 included in the second learning data set 322 may be used as the image data 2221. In addition, the image data 2221 may be generated by applying the above predetermined conversion processing to the captured image data or the image data 3221.

Then, the obtained image data 2221 is combined with the acceptance/rejection data 2222 indicating the correct answer for whether to adopt the image data 2221 as learning data used in machine learning for acquiring the ability to determine the acceptability of the product, and thereby the first learning data set 222 can be created. By repeating this creation, plural pieces of first learning data sets 222 can be created.

Besides, the data format of the acceptance/rejection data 2222 may be appropriately determined according to the format of the output of the first discriminator 51 (that is, the output value obtained from the output layer 514). For example, the acceptance/rejection data 2222 may be set to indicate whether to adopt the image data 2221 as learning data by a binary value. In addition, for example, the acceptance/rejection data 2222 may be appropriately set to indicate the degree of being appropriate or inappropriate as learning data by a continuous value. As one index, the acceptance/rejection data 2222 is set to indicate that the image data 2221 is not adopted as learning data when the image data 2221 is more unnatural as an image of the product. On the other hand, the acceptance/rejection data 2222 is set to indicate that the image data 2221 is adopted as learning data when the image data 2221 is more natural as an image of the product. Being unnatural as an image of the product refers to, for example, a state in which the image is not an normal image obtained by photographing with a camera, such as a state in which the image of the product is deformed to an unrealistic degree and a state in which the region of the product is so unclear that cannot be distinguished. The unnatural degree may be appropriately determined.

The creation of the first learning data set 222 may be performed by the first learning device 2. In this case, the control part 21 may create plural pieces of first learning data sets 222 according to the operation of the input device 24 performed by the operator. In addition, the control part 21 may automatically create the plural pieces of first learning data sets 222 by the processing of the acceptance/rejection learning program 221. By executing the creation processing, the control part 21 may acquire the plural pieces of first learning data sets 222 in step S201.

Alternatively, the creation of the first learning data sets 222 may be performed by an information processing device other than the first learning device 2. In another information processing device, the plural pieces of first learning data sets 222 may be manually created by the operator or may be automatically created by the processing of programs. In this case, in step S201, the control part 21 may acquire the first learning data sets 222 created by another information processing device via a network, the storage medium 92, or the like.

The number of pieces of the acquired first learning data sets 222 may not be particularly limited and may be appropriately determined, for example, to the extent that the machine learning of the first discriminator 51 can be performed. Thereby, when the acquisition of the plural pieces of first learning data sets 222 is completed, the control part 21 advances the processing to the next step S202.

(Step S202)

In step S202, the control part 21 operates as the first learning processing part 212 and executes machine learning using each piece of the acquired first learning data sets 222. In the embodiment, the control part 21 uses each piece of the first learning data sets 222 to execute machine learning of the neural network 52 so as to output, from the output layer 524, the output value corresponding to the correct answer indicated by the acceptance/rejection data 2222 when the image data 2221 is input to the convolutional layer 521.

Specifically, first, the control part 21 prepares the neural network 52 (first discriminator 51 before learning) subjected to learning processing. The parameters such as the configuration of the prepared neural network 52, the initial value of the coupling weight between the neurons, and the initial value of the threshold value of each neuron may be given by a template or an input from the operator. When re-learning is performed, the control part 21 may prepare the neural network 52 before learning based on the first learning result data 129 to be re-learned.

Next, the control part 21 uses the image data 2221 included in each piece of the first learning data sets 222 acquired in step S201 as input data and uses the acceptance/rejection data 2222 as teacher data, to execute the learning processing of the neural network 52. A stochastic gradient descent method or the like may be used in the learning processing of the neural network 52.

For example, the control part 21 inputs the image data 2221 to the convolutional layer 521 disposed closest to the input side, and performs the ignition determination of each neuron included in each of the layers 521-524 in order from the input side. Thereby, the control part 21 obtains an output value from the output layer 524. Next, the control part 21 calculates an error between the output value obtained from the output layer 524 and the value corresponding to the correct answer indicated by the acceptance/rejection data 2222. Subsequently, the control part 21 uses the calculated error of the output value to calculate each error of the coupling weight between the neurons and the threshold value of each neuron by the method of back propagation through time. Then, the control part 21 updates the values of the coupling weight between the neurons and the threshold value of each neuron based on each calculated error.

The control part 21 repeats the series of processing for each piece of the first learning data sets 222 until the output value obtained from the output layer 524 by inputting the image data 2221 to the convolutional layer 521 disposed closest to the input side matches the value corresponding to the correct answer indicated by the acceptance/rejection data 2222 associated with the input image data 2221. Thereby, the control part 21, can construct the trained neural network 52 (that is, the first discriminator 51) that outputs the output value corresponding to the correct answer for acceptance/rejection indicated by the acceptance/rejection data 2222 when the image data 2221 is input. When the learning processing of the neural network 52 is completed, the control part 21 advances the processing to the next step S203.

(Step S203)

In step S203, the control part 21 operates as the first learning processing part 212 and stores, in the storage part 22, information indicating the configuration of the neural network 52 after learning constructed by machine learning (that is, the first discriminator 51), the coupling weight between the neurons, and the threshold value of each neuron as the first learning result data 129. Thereby, the control part 21 ends the processing according to this operation example.

Besides, the control part 21 may transfer the created first learning result data 129 to the learning data generation device 1 after the processing in step S203 is completed. In addition, the control part 21 may update the first learning result data 129 by periodically executing the learning processing in steps S201 to S203. Then, the control part 21 may transfer the created first learning result data 129 to the learning data generation device 1 each time the learning processing is executed, and thereby periodically update the first learning result data 129 kept by the learning data generation device 1. In addition, for example, the control part 21 may save the created first learning result data 129 in an external storage region such as a NAS. In this case, the learning data generation device 1 may acquire the first learning result data 129 from this external storage region. In addition, the first learning result data 129 may be incorporated in the learning data generation device 1 in advance.

[Second Learning Device]

Figure 12:
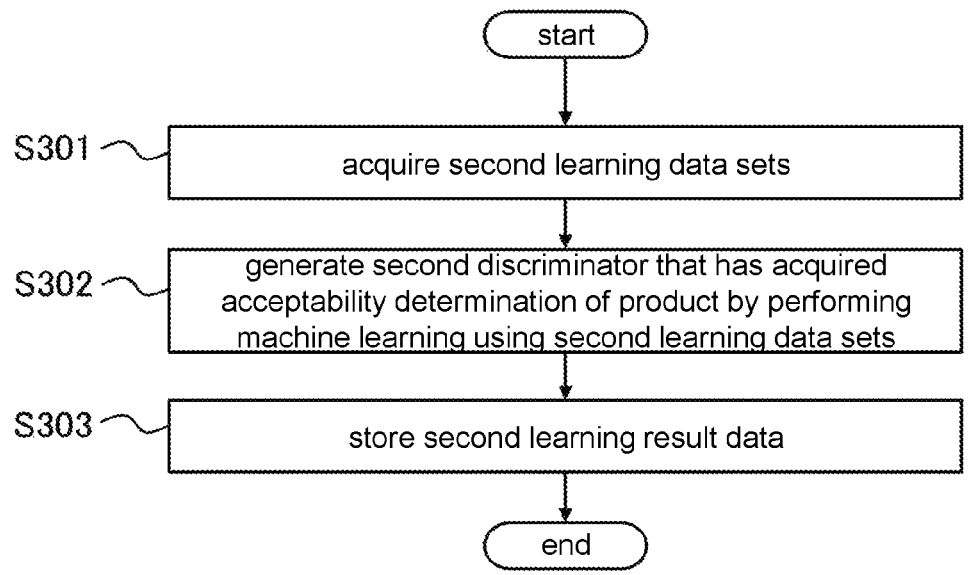
FIG. 12 illustrates an example of the processing procedure of the second learning device according to the embodiment.

Next, an operation example of the second learning device 3 according to the embodiment is described with reference to FIG. 12. FIG. 12 is a flowchart illustrating an example of the processing procedure of the second learning device 3 according to the embodiment. However, the processing procedure described below is merely an example, and each processing may be changed as much as possible. In addition, regarding the processing procedure described below, steps can be omitted, replaced, and added appropriately according to the embodiment.

(Step S301)

In step S301, the control part 31 operates as the second learning data acquisition part 311 and acquires plural pieces of second learning data sets 322 respectively configured by a combination of the image data 3221 and the correct answer data 3222.

The method for acquiring the second learning data sets 322 may not be particularly limited and may be appropriately determined according to the embodiment. Each piece of the second learning data set 322 may be acquired by a method similar to the method for acquiring the combination of the first image data 122 and the first correct answer data 123. That is, the control part 31 may create each piece of the second learning data sets 322 according to the operation of the input device 34 performed by the operator, or may automatically create each piece of the second learning data sets 322 by the processing of the learning program 321. Alternatively, the control part 31 may acquire the second learning data sets 322 created by another information processing device via s network, the storage medium 93, or the like.

In addition, at least some of the acquired second learning data sets 322 are the learning data sets 127 created by the learning data generation device 1. The control part 31 may acquire the learning data sets 127 created by the learning data generation device 1 as the second learning data sets 322 via a network, the storage medium 93, or the like. In addition, the control part 31 may acquire the combination of the first image data 122 and the first correct answer data 123 used for generating the learning data set 127 as the second learning data set 322.

Besides, the data format of the correct answer data 3222 may be appropriately determined according to the format of the output of the second discriminator 54. For example, the correct answer data 3222 may be set to indicate the acceptability of the product by a binary value. In addition, for example, the correct answer data 3222 may be set so that the probability that the product is non-defective (that is, has no defect) or the probability that the product has a defect is indicated by a continuous value. In addition, for example, the correct answer data 3222 may be set to indicate an index of the product acceptability or the defect type. In addition, for example, the correct answer data 3222 may be set to indicate a defective location or the like.

The number of pieces of the acquired second learning data sets 322 may not be particularly limited and may be appropriately determined, for example, to the extent that machine learning of the second discriminator 54 can be performed. Thereby, when the acquisition of the plural pieces of second learning data sets 322 is completed, the control part 31 advances the processing to the next step S302.

(Step S302)

In step S302, the control part 31 operates as the second learning processing part 312, and performs machine learning using the plural pieces of second learning data sets 322 including the learning data sets 127 generated by the learning data generation device 1. In the embodiment, the control part 31 uses each piece of the second learning data sets 322 to execute machine learning of the neural network 53 so as to output, from the output layer 534, the output value corresponding to the correct answer indicated by the correct answer data 3222 when the image data 3221 is input to the convolutional layer 531. Thereby, the control part 31 constructs the second trained discriminator 54 that has acquired the ability to determine the acceptability of a product.

The machine learning method may be the same as in step S202. The control part 31 prepares the neural network 53 (the second discriminator 54 before learning) subjected to learning processing. Then, the control part 31 uses the image data 3221 included in each piece of the second learning data sets 322 acquired in step 301 as input data and uses the correct answer data 3222 as teacher data, to executing the learning processing of the neural network 53.

Thereby, the control part 31 can construct the trained neural network 53 (that is, the second discriminator 54) that outputs, when the image data 3221 is input to the convolutional layer 531 disposed closest to the input side, the output value corresponding to the correct answer indicated by the correct answer data 3222 associated with the input image data 3221 from the output layer 534. When the learning processing of the neural network 53 is completed, the control part 31 advances the processing to the next step S303.

(Step S303)

In step S303, the control part 31 operates as the second learning processing part 312 and store, in the storage part 32, information indicating the configuration of the trained neural network 53 constructed by machine learning (that is, the second discriminator 54), the coupling weight between the neurons, and the threshold value of each neuron as the second learning result data 323. Thereby, the control part 31 ends the processing according to this operation example.

Besides, the control part 31 may transfer the created second learning result data 323 to the inspection device 4 after the processing in step S303 is completed. In addition, the control part 31 may update the second learning result data 323 by periodically executing the learning processing in steps S301 to S303. Then, the control part 31 may transfer the created second learning result data 323 to the inspection device 4 each time the learning processing is executed, and thereby periodically update the second learning result data 323 kept by the inspection device 4. In addition, for example, the control part 31 may save the created second learning result data 323 in an external storage region such as a NAS. In this case, the inspection device 4 may acquire the second learning result data 323 from this external storage area. In addition, the second learning result data 323 may be incorporated in the inspection device 4 in advance.

Furthermore, the control part 31 may use an evaluation data set to evaluate the determination performance of the constructed second discriminator 54. The evaluation data set can be configured in the same manner as the second learning data set 322. That is, the evaluation data set may be configured by a combination of image data of a product and correct answer data indicating the correct answer for the acceptability determination of the product in the image data. As in step S402 described later, the control part 31 uses the second discriminator 54 to determine the acceptability of the product in the image data of the evaluation data set. The control part 31 can evaluate the determination performance of the second discriminator 54 by collating the determination result with the correct answer indicated by the correct answer data.

When the determination performance of the second discriminator 54 is equal to or less than a predetermined reference (for example, the correct answer rate is equal to or less than a threshold value), the control part 31 may transmit one or more second learning data set 322 selected from the plural pieces of second learning data sets 322 to the learning data generation device 1. Then, the control part 31 may use the transmitted second learning data sets 322 as the combinations of the first image data 122 and the first correct answer data 123, and request the learning data generation device 1 to generate plural pieces of learning data sets 127. Accordingly, by receiving the plural pieces of learning data sets 127 generated by the learning data generation device 1, the control part 31 can increase the number of pieces of the second learning data sets 322 used for machine learning.

[Inspection Device]

Figure 13:
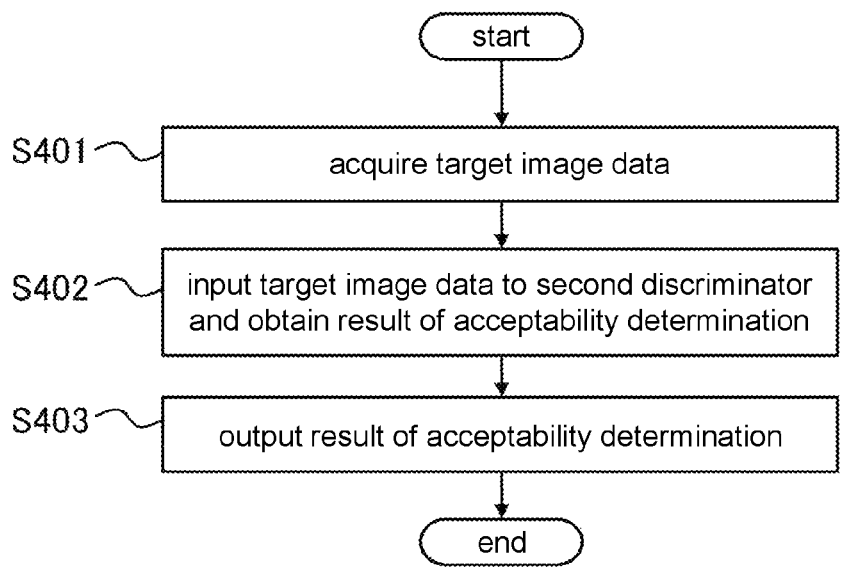
FIG. 13 illustrates an example of the processing procedure of the inspection device according to the embodiment.

Next, an operation example of the inspection device 4 is described with reference to FIG. 13. FIG. 13 is a flowchart illustrating an example of the processing procedure of the inspection device 4. However, the processing procedure described below is merely an example, and each processing may be changed as much as possible. In addition, regarding the processing procedure described below, steps can be omitted, replaced, and added appropriately according to the embodiment.

(Step S401)

In step S401, the control part 41 operates as the target data acquisition part 411 and acquires the target image data 422 of the product R to be inspected. In the embodiment, the inspection device 4 is connected to the camera 81 via the external interface 44. Therefore, the control part 41 acquires the target image data 422 from the camera 81. The target image data 422 may be moving image data or still image data. When the target image data 422 is acquired, the control part 41 advances the processing to the next step S402.

However, the route for acquiring the target image data 422 may not be limited to this example and may be appropriately selected according to the embodiment. For example, another information processing device different from the inspection device 4 may be connected to the camera 81. In this case, the control part 41 may acquire the target image data 422 by accepting the transmission of the target image data 422 from another information processing device.

(Step S402)

In step S402, the control part 41 operates as the acceptability determination part 412, and uses the second discriminator 54 to determine the acceptability of the product R in the target image data 422.

Specifically, the control part 41 refers to the second learning result data 323 to set the second trained discriminator 54. Subsequently, the control part 41 inputs the target image data 422 to the convolutional layer 541 disposed closest to the input side of the second discriminator 54, and performs the ignition determination of each neuron included in each of the layers 541-544 in order from the input side. Thereby, the control part 41 acquires, from the output layer 544, the output value corresponding to the result of determining the acceptability of the product R in the target image data 422.

Then, the control part 41 determines the acceptability of the product R in the target image data 422 based on the output value obtained from the output layer 544 of the second discriminator 54. The method for determining the acceptability of the product R may be appropriately determined according to the output format of the second discriminator 54. For example, when the output value obtained from the second discriminator 54 indicates the acceptability of the product R by a binary value, the control part 41 can specify the acceptability of the product R according to the output value obtained from the second discriminator 54. In addition, for example, when the output value obtained from the second discriminator 54 indicates the probability that the product R is non-defective or the probability that the product R is defective by a continuous value, the control part 41 can determine the acceptability of the product R by comparing the output value obtained from the second discriminator 54 with a threshold value. In addition, for example, when the output value obtained from the second discriminator 54 indicates a defective location, the control part 41 can determine the acceptability of the product R in the target image data 422 based on the output value obtained from the second discriminator 54 and specify, when there is a defect, the location of the defect.

In addition, for example, when the output value obtained from the second discriminator 54 indicates an index of the acceptability of the product R or the type of defect, the inspection device 4 may keep, in the storage part 42, reference information (not shown) in a table format or the like in which the output value obtained from the second discriminator 54 is associated with the acceptability of the product R or the type of defect. In this case, the control part 41 can determine the acceptability of the product R in the target image data 422 according to the output value obtained from the second discriminator 54 by referring to the reference information.

As described above, the control part 41 can use the second discriminator 54 to determine the acceptability of the product R in the target image data 422. When the acceptability determination of the product R is completed, the control part 41 advances the processing to the next step S403.

(Step S403)

In step S403, the control part 41 operates as the output part 413 and outputs the result of determining the acceptability of the product R by step S402.

The output format of the result of determining the acceptability of the product R may not be particularly limited and may be appropriately selected according to the embodiment. For example, the control part 41 may directly output the result of the acceptability determination of the product R to the output device 46. In addition, when it is determined in step S402 that the product R has a defect, the control part 41 may issue, as the output processing in step S403, a warning for notifying that the defect is found. In addition, the control part 41 may execute predetermined control processing according to the result of the acceptability determination of the product R as the output processing in step S403. As a specific example, in the case where the inspection device 4 is connected to a production line for transporting products, when it is determined that the product R has a defect, the control part 41 may perform, as the output processing in step 403, processing for transmitting a command to transport the defective product R on a route different from that of the product having no defect.

When the output processing for the result of determining the acceptability of the product R is completed, the control part 41 ends the processing according to this operation example. Besides, the control part 41 may execute a series of processing in steps S401 to S403 each time the product R transported on the production line enters the photographing range of the camera 81. Thereby, the inspection device 4 can perform the visual inspection of the product R transported on the production line.

[Characteristics]

As described above, according to the learning data generation device 1 of the embodiment, by the processing in step S102, the second image data 125 serving as a candidate for learning data can be mass-produced by applying the predetermined conversion processing to the first image data 122. In addition, by the processing in step S103, the learning data generation device 1 can prevent the second image data 125 among the plural pieces of mass-produced second image data 125 that is inappropriate as learning data for acquiring the ability to determine the acceptability of the product from being used for machine learning. Therefore, according to the learning data generation device 1 of the embodiment, it is possible to prepare a sufficient number of pieces of appropriate second learning data sets 322 at low cost by increasing the number of pieces of the second learning data sets 322 by the learning data sets 127 generated in step S104. Accordingly, in the second learning device 3, by the processing in steps S301 to S303, the second discriminator 54 having relatively high precision of determining the acceptability of the product can be constructed by performing machine learning using the prepared sufficient number of pieces of second learning data sets 322. Consequently, according to the embodiment, it is possible to generate the second discriminator 54 having relatively high precision of acceptability determination at low cost.

§ 4 Variation Example

Although the embodiment of the present invention has been described above in detail, the above description is merely an example of the present invention in all aspects. It is evident that various improvements or modifications can be made without departing from the scope of the present invention. For example, the following changes are possible. Besides, in the following, the same constituent elements as the above embodiment are denoted by the same reference signs, and the description of the same points as the above embodiment is omitted appropriately. The following variation examples can be combined appropriately.

<4.1>

In the above embodiment, each discriminator (51, 54) is configured by a convolutional neural network. However, the configuration of each discriminator (51, 54) may not be limited to this example and may be appropriately selected according to the embodiment. For example, each discriminator (51, 54) may be configured by a multilayered fully-coupled neural network, a recurrent neural network, or the like.

<4.2>

In the above embodiment, a neural network is adopted as a learning model of each discriminator (51, 54). However, the learning model of each discriminator (51, 54) may not be limited to this example and may be appropriately selected according to the embodiment. As the learning model of each discriminator (51, 54), for example, a support vector machine, a self-organizing map, a learning model for performing machine learning by reinforcement learning, or the like may be adopted.

Besides, when supervised learning is not adopted as the machine learning, each correct answer data (2222, 3222) may be omitted in each learning data set (222, 322). In this case, in step S101, the control part 11 of the learning data generation device 1 may omit the acquisition of the first correct answer data 123 and acquire only the first image data 122 of the product. In addition, in step S104, the control part 11 may omit the addition of the second correct answer data 126 and generate, by collecting the second image data 125 determined to be adopted as learning data, a learning data group configured by the plural pieces of second image data 125 determined to be adopted as learning data. The second learning device 3 may use the learning data group for machine learning to construct the second discriminator 54.

<4.3>

In the above embodiment, each learning result data (129, 323) includes the information indicating the configuration of the neural network. However, the configuration of each learning result data (129, 323) may not be limited to this example, and may be appropriately determined according to the embodiment as long as this configuration can be used for setting each trained discriminator (51, 54). For example, when the configuration of the used neural network is common in all the devices, each learning result data (129, 323) may not include the information indicating the configuration of the neural network.

<4.4>

In the above embodiment, the inspection system 100 includes the first learning device 2 that constitutes the first discriminator 51. However, the first discriminator 51 may be configured by an information processing device outside the inspection system 100. In this case, the first learning device 2 may be omitted in the inspection system 100.

<4.5>

In the above embodiment, the control part 11 of the learning data generation device 1 sets the content of the second correct answer data 126 based on the first correct answer data 123 in step S104. However, the method for setting the content of the second correct answer data 126 may not be limited to this example. For example, the control part 11 may accept the input of the content of the second correct answer data 126 performed by the operator via the input device 14. At this time, as a reference for the operator to determine the content of the second correct answer data 126, the control part 11 may output at least one of the second image data 125 and the first correct answer data 123 via the output device 15.

<4.6>

In the above embodiment, the first discriminator 51 is constructed by machine learning using the first learning data set 222 configured by the combination of the image data 2221 and the acceptance/rejection data 2222. However, the method for constructing the first discriminator 51 may not be limited to this example.

Configuration Example

Figure 14:
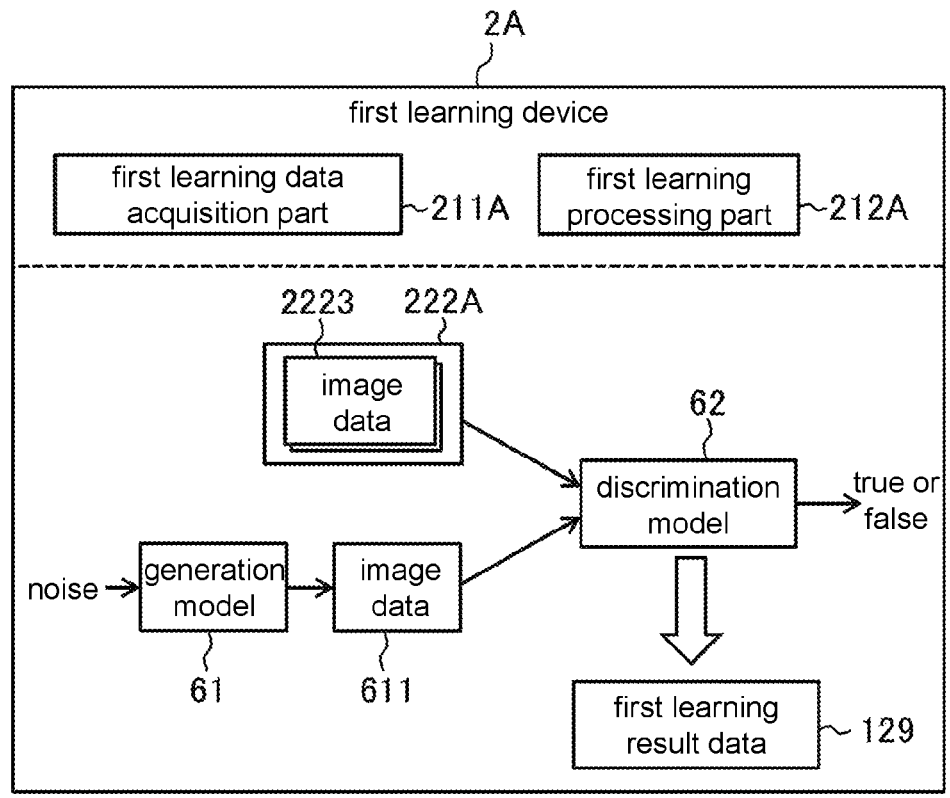
FIG. 14 schematically illustrates an example of the software configuration of a first learning device according to another embodiment.

First, an example of the configuration of a first learning device 2A that constructs the first discriminator by a method different from the above embodiment is described with reference to FIG. 14. FIG. 14 schematically illustrates an example of the software configuration of the first learning device 2A according to the variation example. The first learning device 2A according to the variation example has the same hardware configuration as the first learning device 2. That is, the first learning device 2A is a computer in which the control part 21, the storage part 22, the communication interface 23, the input device 24, the output device 25, and the drive 26 are electrically connected.

As shown in FIG. 14, by the control part 21 executing a program, the first learning device 2A operates as a computer which includes, as the software modules, a first learning data acquisition part 211A and a first learning processing part 212A. That is, in the variation example, each software module is also realized by the control part 21 (CPU) as in the above embodiment.

The first learning data acquisition part 221A acquires an image data group 222A configured by plural pieces of image data 2223. The image data 2223 is an example of the "third image data" of the present invention. The first learning processing part 212A performs machine learning of each of a generation model 61 and a discrimination model 62. The generation model 61 performs machine learning on the image data group 222A so as to generate image data 611 similar to the image data 2223. The image data 611 is an example of the "fourth image data" of the present invention. On the other hand, the discrimination model 62 performs machine learning so as to discriminate the image data 611 derived from the generation model 61 or the image data 2223 derived from the image data group 222A.

A network including the generation model 61 and the discriminant model 62 alternately performs the machine learning of each model (61, 62). That is, the generation model 61 repeats the machine learning so as to generate the image data 611 similar to the image data 2223 in which the discrimination model 62 misdiscriminates. On the other hand, the discrimination model 62 performs the machine learning so as to discriminate the image data 611 generated by the generation model 61 subjected to repeated machine learning and the image data 2223 derived from the image data group 222A.

The generation model 61 and the discrimination model 62 are configured by, for example, a neural network. The first learning processing part 212A saves the constructed discrimination model 62 of this network as a first discriminator. That is, the first learning processing part 212A stores, in the storage part 22, information indicating the configuration of the discriminant model 62 after learning, the coupling weight between the neurons, and the threshold value of each neuron as the first learning result data 129.

Operation Example

Figure 15:
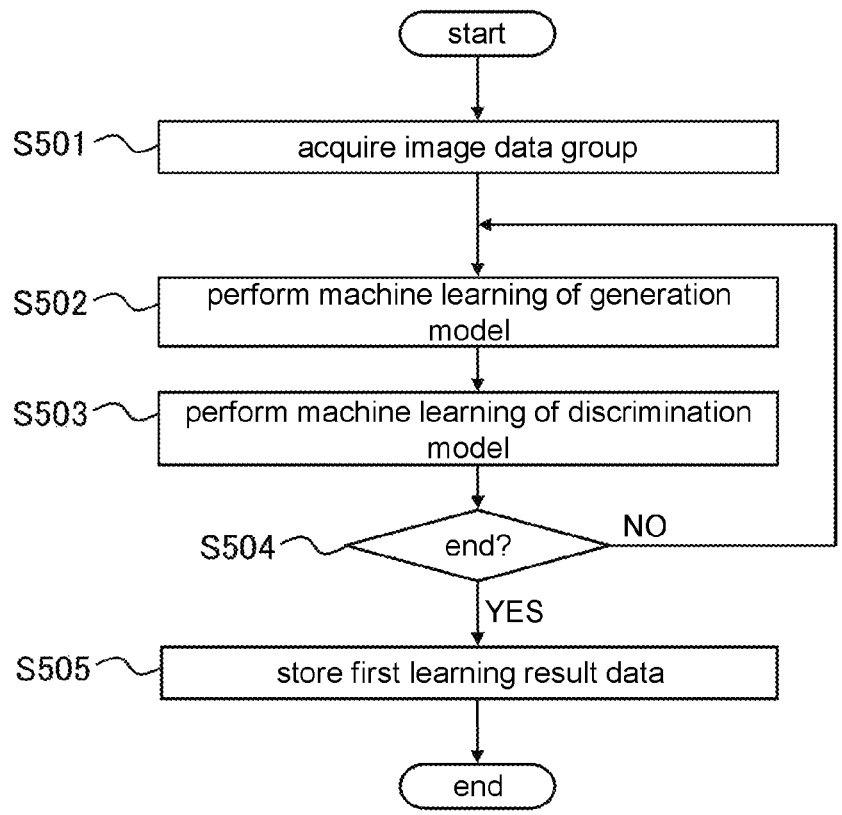
FIG. 15 illustrates an example of the processing procedure of the first learning device according to another embodiment.

Next, an operation example of the first learning device 2A according to the variation example is described with reference to FIG. 5. FIG. 15 is a flowchart illustrating an example of the processing procedure of the first learning device 2A according to the variation example. However, the processing procedure described below is merely an example and each processing may be changed as much as possible. In addition, regarding the processing procedure described below, steps can be omitted, replaced, and added appropriately according to the embodiment.

(Step S501)

In step S501, the control part 21 operates as the first learning data acquisition part 211A and acquires the image data group 222A configured by the plural pieces of image data 2223. Each piece of image data 2223 may be acquired by the same method as the first image data 122. When the image data group 222A is acquired, the control part 21 advances the processing to the next step S502.

(Step S502)

In step S502, the control part 21 performs the machine learning of the generation model 61. As described above, the generation model 61 is configured by a neural network. For example, the control part 21 uses meaningless data (for example, noise) as input data and uses the image data 2223 included in the image data group 222A as teacher data to perform the machine learning of the generation model 61. That is, the control part 21 performs the machine learning of the generation model 61 so as to output image data corresponding to the image data 2223 when noise is input. The method for machine learning may be the same as in step S202. Thereby, the generation model 61 is constructed so as to generate the image data 611 similar to the image data 2223 for the image data group 222A. When the machine learning of the generation model 61 is completed, the control part 21 advances the processing to the next step S503.

(Step S503)

In step S503, the control part 21 performs the machine learning of the discrimination model 62. As described above, the discrimination model 62 is configured by a neural network. For example, the control part 21 generates a data set which is configured by a combination of the image data 2223 included in the image data group 222A and the correct answer data indicating that the image data 2223 is derived from the image data group 222A (that is, true). In addition, the control part 21 generates a data set which is configured by a combination of the image data 611 generated by the generation model 61 and the correct answer data indicating that the image data 611 is derived from the generation model 61 (that is, false).

Then, the control part 21 uses the image data 2223 or the image data 611 as input data, and uses the correct answer data associated with each image data (2223, 611) as teacher data, to perform the machine learning of the discrimination model 62. That is, the control part 21 performs the machine learning of the discrimination model 62 so as to output, when each image data (2223, 611) is input, the value corresponding to the correct answer data associated with each image data (2223, 611). The method for machine learning may be the same as in step S202. Thereby, the discrimination model 62 is constructed to discriminate the image data 611 derived from the generation model 61 or the image data 2223 derived from the image data group 222A.

When the machine learning of the discrimination model 62 is completed, the control part 21 advances the processing to the next step S504.

(Step S504)

In step S504, the control part 21 determines whether to repeat the machine learning processing in steps S502 and S503. The criterion for repeating the machine learning processing may be appropriately determined according to the embodiment. For example, the number of times for performing the machine learning in steps S502 and S503 may be set. In this case, the control part 21 determines whether the number of times for performing the machine learning in steps S502 and S503 has reached a set number. When it is determined that the number of times for performing the machine learning in steps S502 and S503 has not reached the set number, the control part 21 returns the processing to step S502. On the other hand, when it is determined that the number of times for performing the machine learning in steps S502 and S503 has reached the set number, the control part 21 advances the processing to step S505.

Thereby, the generation model 61 and the discrimination model 62 alternately perform the machine learning. In this process, the generation model 61 is constructed to generate the image data 611 similar to the image data 2223 in which the discrimination model 62 misdiscriminates. On the other hand, the discrimination model 62 is constructed to discriminate the image data 611 generated by the generation model 61 subjected to repeated machine learning and the image data 2223 derived from the image data group 222A. In other words, the generation model 61 is constructed to be capable of generating the image data 611 that is closer to the image data 2223, and the discrimination model 62 is constructed to be capable of discriminating the image data 611 and the image data 2223.

(Step S505)

In step S505, the control part 21 operates as the first learning processing part 212A and saves, as the first discriminator, the discrimination model 62 of the network constructed by repeating the processing in steps S502 and S503. That is, the control part 21 stores, in the storage part 22, information indicating the configuration of the discriminant model 62 after learning, the coupling weight between the neurons, and the threshold value of each neurons as the first learning result data 129. Thereby, the control part 21 ends the processing according to the operation example.

Besides, in the variation example, the output of the first discriminator (the discrimination model 62) indicates the result of determining the image data 611 derived from the generation model 61 or the image data 2223 derived from the image data group 222A. Among these, the determination on the image data 611 derived from the generation model 61 corresponds to determination that the image data 611 is not adopted as learning data. On the other hand, the determination on the image data 2223 derived from the image data group 222A corresponds to determination that the image data 2223 is adopted as learning data. That is, according to the variation example, it is possible to construct the first discriminator which determines that the pseudo image data 611 generated from noise is not adopted as learning data. Therefore, it is possible to extract, using this first discriminator, the second image data 125 appropriate as learning data from the plural pieces of second image data 125 generated from the first image data 122. Consequently, according to the variation example, similar to the above embodiment, it is possible to prepare a sufficient number of pieces of appropriate second learning data sets 322 at low cost, and thus it is possible to generate the second discriminator 54 having relatively high precision of acceptability determination at low cost.

<4.7>

In the above embodiment, an example has been shown in which the present invention is applied to a scene for performing the visual inspection of the product R. However, the applicable scope of the present invention may not be limited to this scene of the visual inspection. The present invention can be widely applied to all scenes in which the characteristics of a subject in image data are discriminated.

Figure 16:
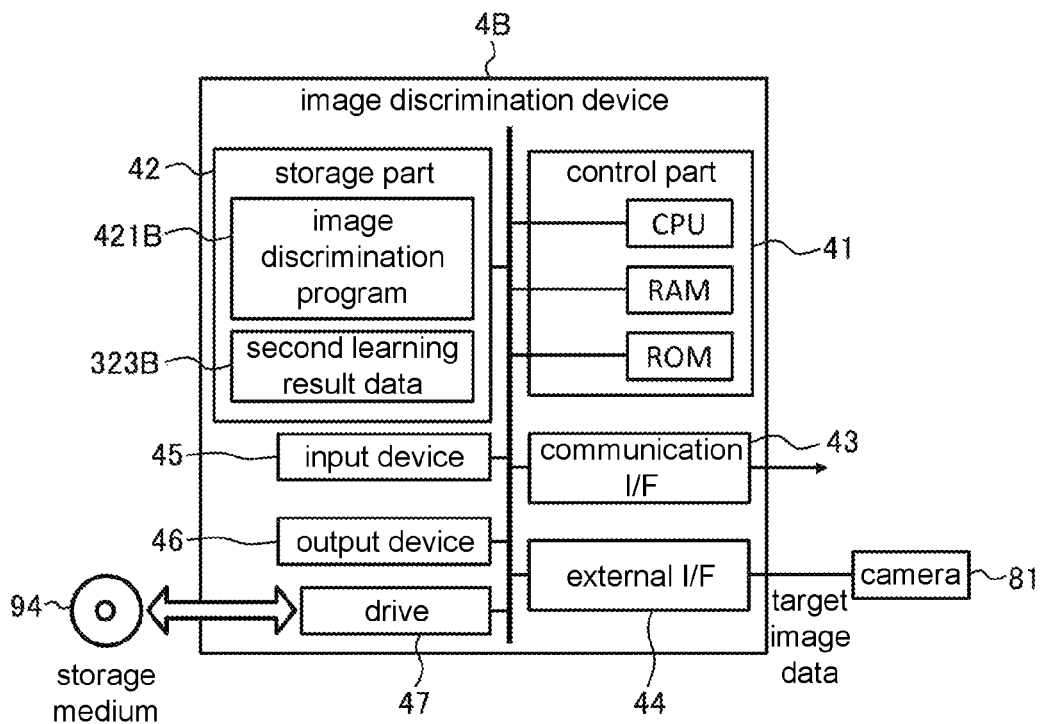
FIG. 16 schematically illustrates an example of the hardware configuration of an image discrimination device according to another embodiment.
Figure 17:
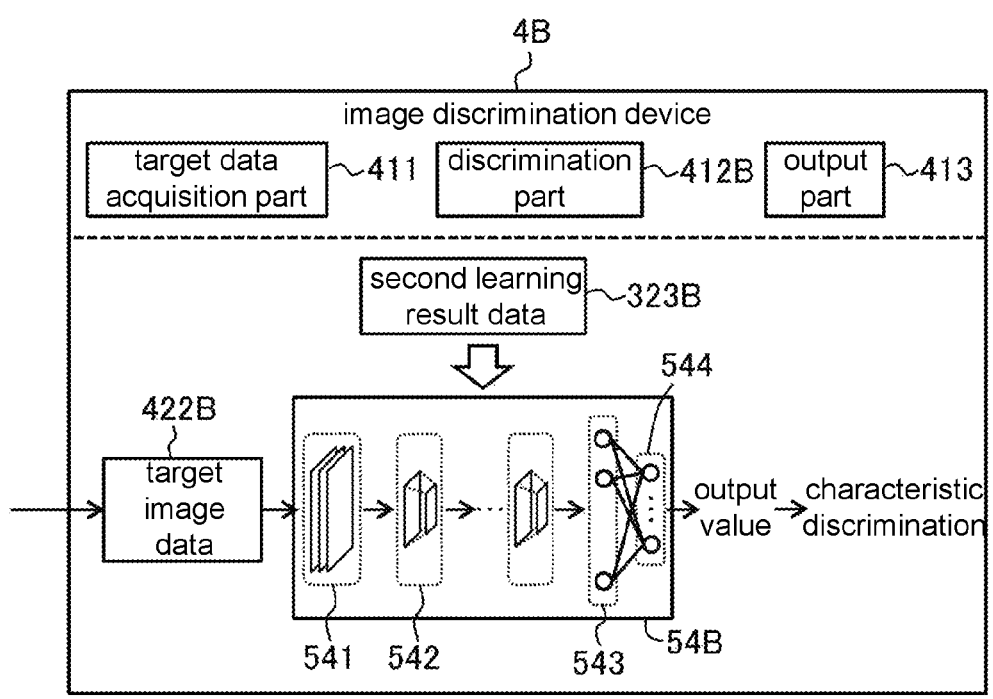
FIG. 17 schematically illustrates an example of the software configuration of the image discrimination device according to another embodiment.

A variation example in which the present invention is applied to a scene for discriminating the characteristics of a subject is described with reference to FIGS. 16 and 17. FIGS. 16 and 17 schematically illustrate examples of the hardware configuration and the software configuration of an image discrimination device 4B according to the variation example. The image discrimination system according to the variation example is configured by the learning data generation device 1, the first learning device 2, the second learning device 3, and the image discrimination device 4B. The image discrimination system according to the variation example may be configured in the same manner as the inspection system 100, except that the data to be processed is replaced from the image data of a product to the image data of a certain subject.

That is, the learning data generation device 1 generates a learning data set used in machine learning for causing the discriminator to acquire the ability to discriminate the characteristics of the subject. The first learning device 2 constructs a first trained discrimination that has acquired the ability to determine whether to adopt given image data as learning data of machine learning for acquiring the ability to discriminate the characteristics of the subject. The first discriminator according to the variation example may be configured in the same manner as the first discriminator 51 according to the above embodiment.

The second learning device 3 constructs a second trained discriminator 54B that has acquired the ability to discriminate the characteristics of a subject by performing the machine learning using the learning data set generated by the learning data generation device 1. The second discriminator 54B according to the variation example may be configured in the same manner as the second discriminator 54 according to the above embodiment. The image discrimination device 4B uses the second discriminator 54B to discriminate the characteristics of the subject in target image data 422B.

In the variation example, the subject, the characteristics of the subject to be discriminated may not be particularly limited and may be appropriately selected according to the embodiment. The subject may be, for example, a face of the target, a body of the target, a work-piece to be worked, or the like. In addition, when the subject is a face of the target, the characteristics to be discriminated may be, for example, the type of facial expression, the state of face parts, and the like. When the subject is a body of the target, the characteristics to be discriminated may be, for example, the pose of the body, and the like. When the subject is a work-piece to be worked, the characteristics to be discriminated may be, for example, the position and orientation of the work-piece, and the like.

As shown in FIG. 16, the image discrimination device 4B according to the variation example has the same hardware configuration as that of the inspection device 4. The storage part 42 of the image discrimination device 4B stores various information such as an image discrimination program 421B and second learning result data 323B. The image discrimination program 421B is a program for causing the image discrimination device 4B to execute information processing for discriminating the characteristics of the subject by the same processing procedure as the inspection device 4, and includes a series of instructions for the information processing. The second learning result data 323B is data for setting the second discriminator 54B.

Similar to the inspection device 4, the image discrimination device 4B is connected to the camera 81 via the external interface 44. The camera 81 is appropriately disposed in a place where a subject whose characteristics are to be discriminated can be photographed. For example, when the subject is a face or body of the target, the camera 81 may be disposed at a place where the target serving as a subject may be present. In addition, for example, when the subject is a work-piece to be worked, the camera 81 may be disposed toward a place where the work-piece may present.

As shown in FIG. 17, the image discrimination device 4B operates, by the control part 41 executing the image discrimination program 421B, as a computer which includes the target data acquisition part 411, a discrimination part 412B, and the output part 413 as the software modules. That is, in the variation example, each software module is also realized by the control part 41 (CPU) as in the above embodiment.

The target data acquisition part 411 acquires the target image data 422B of the subject whose characteristics are to be discriminated. The discrimination part 412B discriminates the characteristics of the subject in the target image data 422B based on output obtained from the second discriminator 54B by inputting the acquired target image data 422B to the second discriminator 54B. The output part 413 outputs the result of discriminating the characteristics of the subject.

Operation Example

Next, an operation example of the image discrimination system according to the variation example is described. The image discrimination system according to the variation example operates in substantially the same procedure as the inspection system 100.

<Learning Data Generation Device>

In step S101, the control part 11 of the learning data generation device 1 operates as the data acquisition part 111, and acquires the first image data of a predetermined subject and the first correct answer data indicating the correct answer for the discrimination of the characteristics of the subject in the first image data. Besides, when the first correct answer data is not required, such as in a case of adopting a learning model other than the neural network as the second discriminator 54B and a case of not performing the supervised learning as machine learning, the acquisition of the first correct answer data may be omitted.

In step S102, the control part 11 operates as the first generation part 112 and generates plural pieces of second image data of the subject respectively from the first image data by applying predetermined conversion processing to the first image data. The predetermined conversion processing may be selected from, for example, photometric conversion processing, geometric conversion processing, image synthesis processing, image replacement processing, and a combination thereof.

In step S103, the control part 11 operates as the determination part 113, and determines whether to adopt each piece of the second image data as learning data based on the output obtained from the first discriminator by inputting each piece of the second image data to the first trained discriminator.

Thereby, it is possible to exclude the second image data, among the plural pieces of second image data generated from the first image data, that is unnatural as an image of the subject. When the subject in the first image data is a face of the target, for example, it is possible to exclude the second image data in which a face distorted to the unrealistic degree appears, the second image data that cannot specify the face of the target, and the like.

In step S104, the control part 11 operates as the second generation part 114 and adds, to the second image data determined to be adopted as learning data of machine learning for acquiring the ability to discriminate the characteristics of the subject, the second correct answer data determined based on the first correct answer data and indicating the correct answer for the discrimination of the characteristics of the subject in the second image data. Thereby, the control part 11 generates a learning data set configured by pairs of the second image data and the second correct answer data.

Besides, the control part 11 may generate a learning data group configured by plural pieces of learning data sets by collecting plural pieces of second image data determined to be used as learning data and adding the second correct answer data to each piece of the collected second image data. In addition, similar to the first correct answer data, when the second correct answer data is not required, the addition of the second correct answer data may be omitted. In this case, the control part 11 may generate, by collecting the second image data determined to be adopted as learning data, a learning data group configured by the plural pieces of second image data determined to be adopted as learning data.

<First Learning Device>

The control part 21 of the first learning device 2 constructs, by the processing in steps S201 to S203, the first trained discriminator that has acquired the ability to determine whether to adopt the given image data as the learning data of machine learning for acquiring the ability to discriminate the characteristics of the subject.

That is, in step S201, the control part 21 operates as the first learning data acquisition part 211, and acquires plural pieces of first learning data sets respectively configured by a combination of the image data in which a subject can appear and the acceptance/rejection data indicating the correct answer for determining whether to adopt the image data and as learning data. In steps S202 and S203, the control part 21 operates as the first learning processing part 212, constructs the first discriminator by machine learning using the plural pieces of first learning data sets, and stores the information indicating the configuration of the constructed first discriminator and the like in the storage part 22 as the first learning result data.

Besides, the first discriminator according to the variation example may be configured by the discrimination model 62 as in the variation example of <4.6>. At this time, image data of the subject whose characteristics are to be discriminated is used as the image data 2223.

<Second Learning Device>

The control part 31 of the second learning device 3 constructs, by the processing in steps S301 to S303, the second trained discriminator 54B that has acquired the ability to discriminate the characteristics of the subject in the target image data.

That is, in step S301, the control part 31 operates as the second learning data acquisition part 311, and acquires plural pieces of second learning data sets respectively configured by a combination of the image data of a target subject and the correct answer data indicating the correct answer for the discrimination of the characteristics of the subject in the image data. At least some of the plural pieces of second learning data sets are the learning data sets generated by the learning data generation device 1.

In step S302, the control part 31 operates as the second learning processing part 312 and constructs by performing machine learning using the plural pieces of second learning data sets, the second trained discriminator 54B that has acquired the ability to discriminate the characteristics of the subject. Then, in step S303, the control part 31 operates as the second learning processing part 312, and stores the information indicating the configuration of the constructed second discriminator 54B and the like in the storage part 32 as the second learning result data 323B.

<Image Discrimination Device>

In step S401, the control part 41 of the image discrimination device 4B operates as the target data acquisition part 411, and acquires the target image data 422B of the subject whose characteristics are to be discriminated. In the variation example, the control part 41 acquires the target image data 422B from the camera 81.

In step S402, the control part 41 operates as the discrimination part 412B, and refers to the second learning result data 323B to set the second trained discrimination part 54B. Subsequently, the control part 41 inputs the target image data 422B acquired in step S401 to the second discriminator 54B, and executes the calculation processing of the second discriminator 54B. Thereby, the control part 41 acquires, from the second discriminator 54B, an output value corresponding to the result of discriminating the characteristics of the subject in the target image data 422B. The control part 41 discriminates the characteristics of the subject in the target image data 422B based on the output value acquired from the second discriminator 54B.

In step S403, the control part 41 operates as the output part 413 and outputs the result of discriminating the characteristics of the subject in the target image data 422B. The output format of the result of discriminating the characteristics of the subject may not be particularly limited and may be appropriately selected according to the embodiment. For example, the control part 41 may directly output the result of discriminating the characteristics of the subject to the output device 46. In addition, for example, the control part 41 may execute predetermined output processing according to the discrimination result. As a specific example, in the case where the type of facial expression of the target is discriminated as the characteristic of the subject, the control part 11 may output calming music from the output device 46 to the target when the face of the target is discriminated as angry.

As described above, in the variation example, by increasing the number of pieces of the second learning data sets by the learning data sets generated by the learning data generation device 1, an appropriate number of second learning data sets can be prepared at low cost. Thereby, it is possible to construct the second discriminator 54B having relatively high precision of discriminating the characteristics of the subject by performing the machine learning using the prepared sufficient number of pieces of second learning data sets in the second learning device 3. Consequently, according to the embodiment, it is possible to generate the second discriminator 54B having relatively high precision of discriminating the characteristics of the subject at low cost.

<4.8>

The above embodiment and variation examples show the examples in which the present invention is applied to a scene in which some characteristic is discriminated from image data. However, the applicable scope of the present invention is not limited to this scene in which the characteristic is discriminated from image data. The present invention can be widely applied to a scene in which some characteristic is discriminated from data other than image data or plural types of data.

Configuration Example

Figure 18:
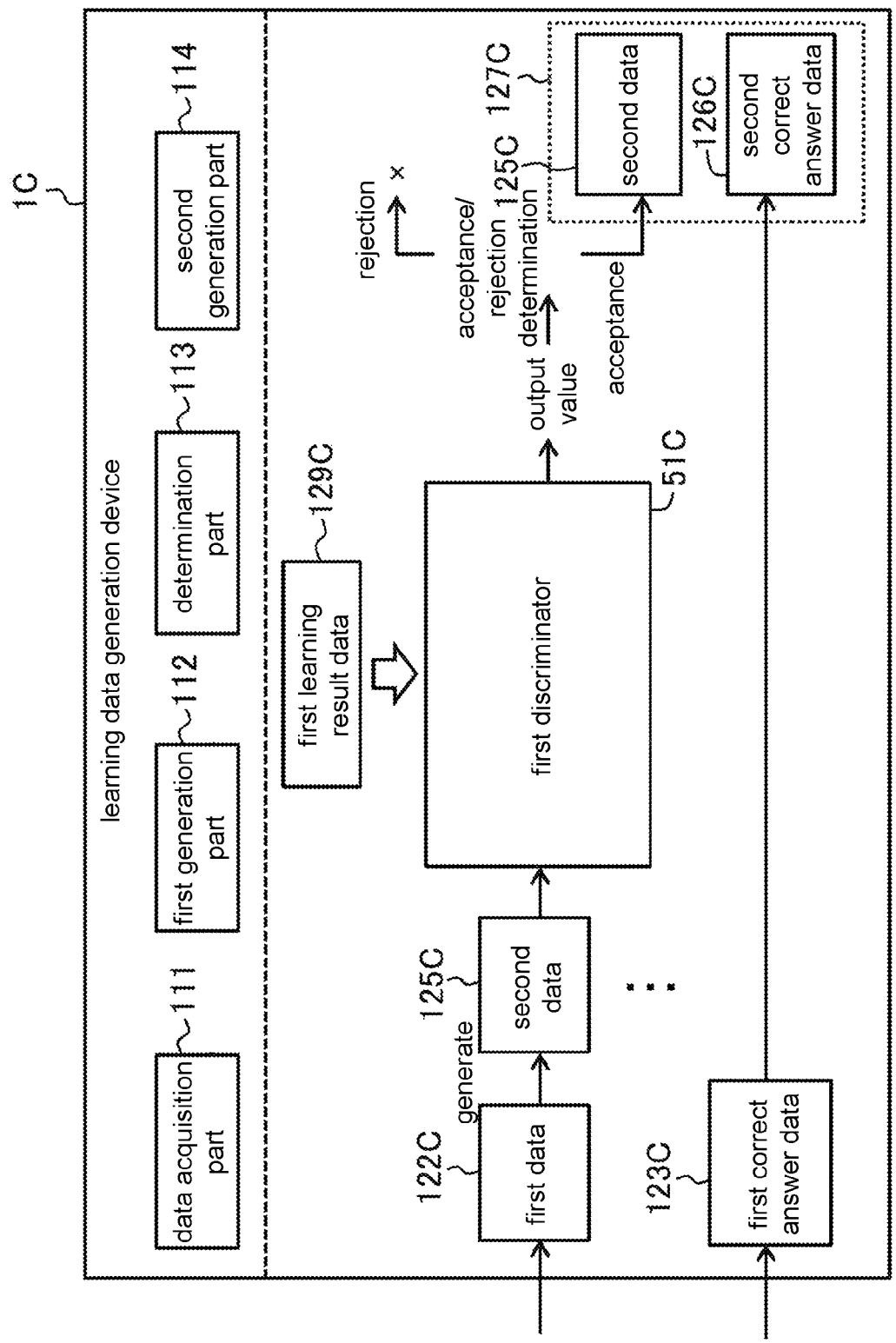
FIG. 18 schematically illustrates an example of the software configuration of a learning data generation device according to another embodiment.
Figure 19:
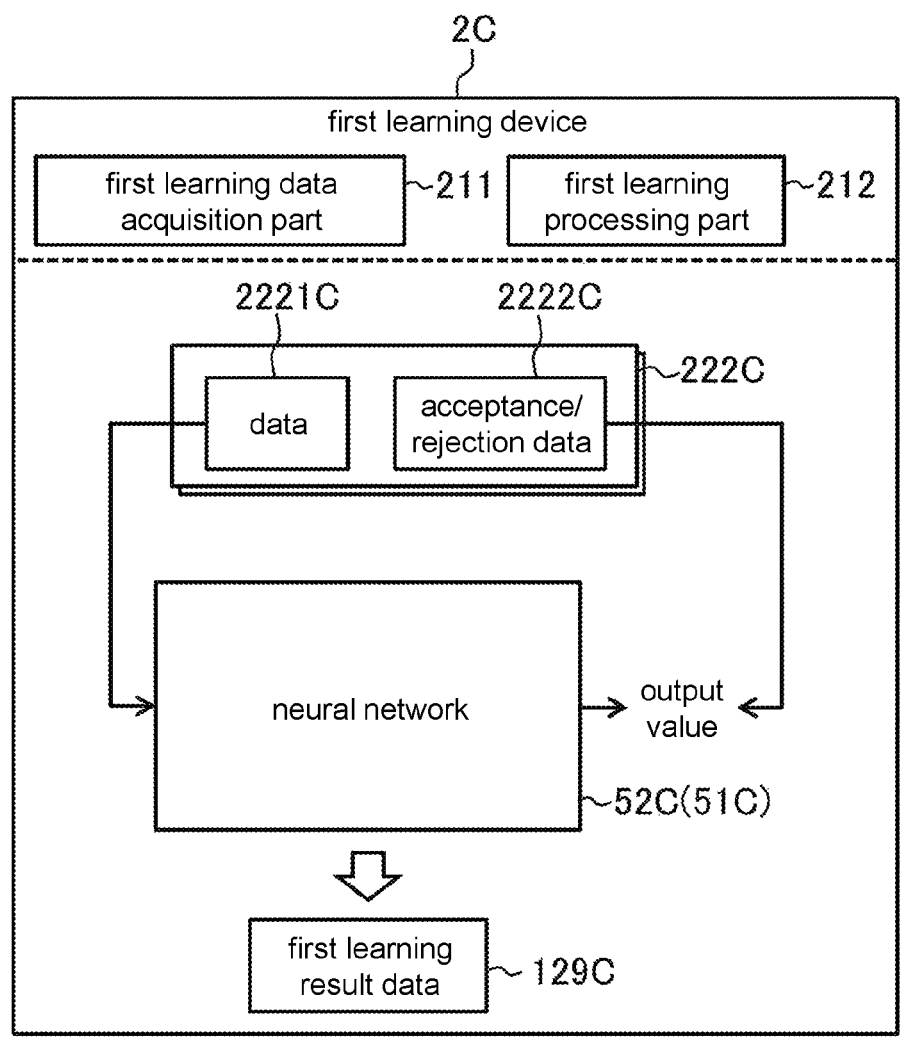
FIG. 19 schematically illustrates an example of the software configuration of the first learning device according to another embodiment.
Figure 20:
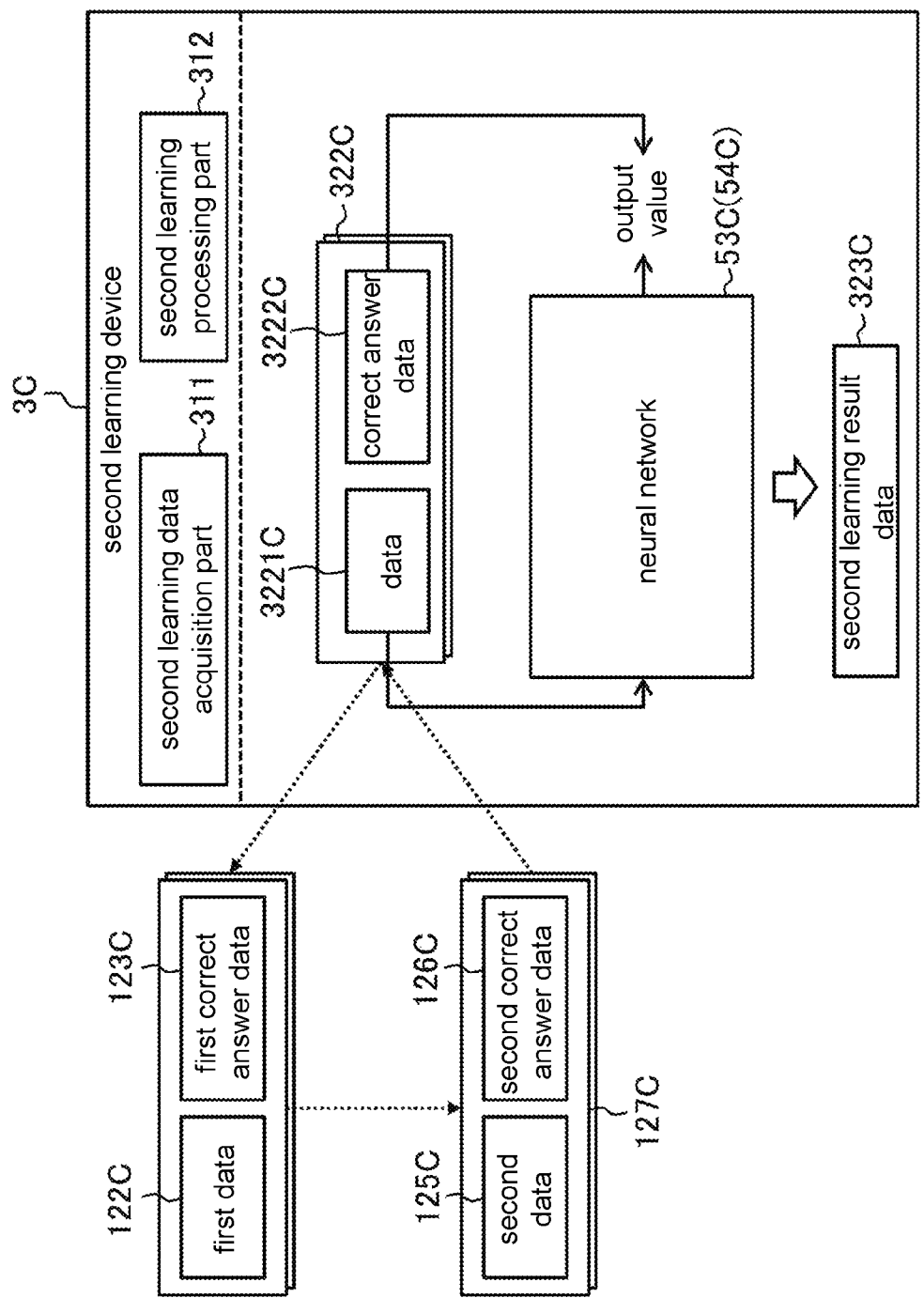
FIG. 20 schematically illustrates an example of the software configuration of a second learning device according to another embodiment.
Figure 21:
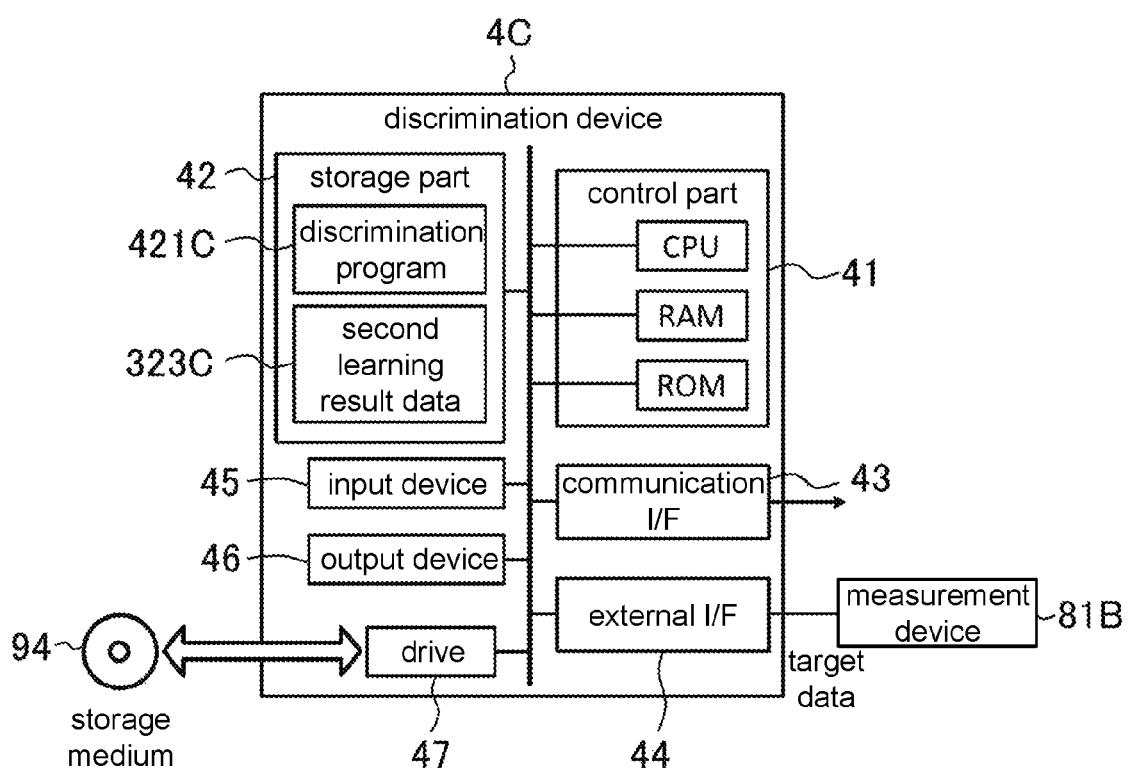
FIG. 21 schematically illustrates an example of the hardware configuration of a discrimination device according to another embodiment.
Figure 22:
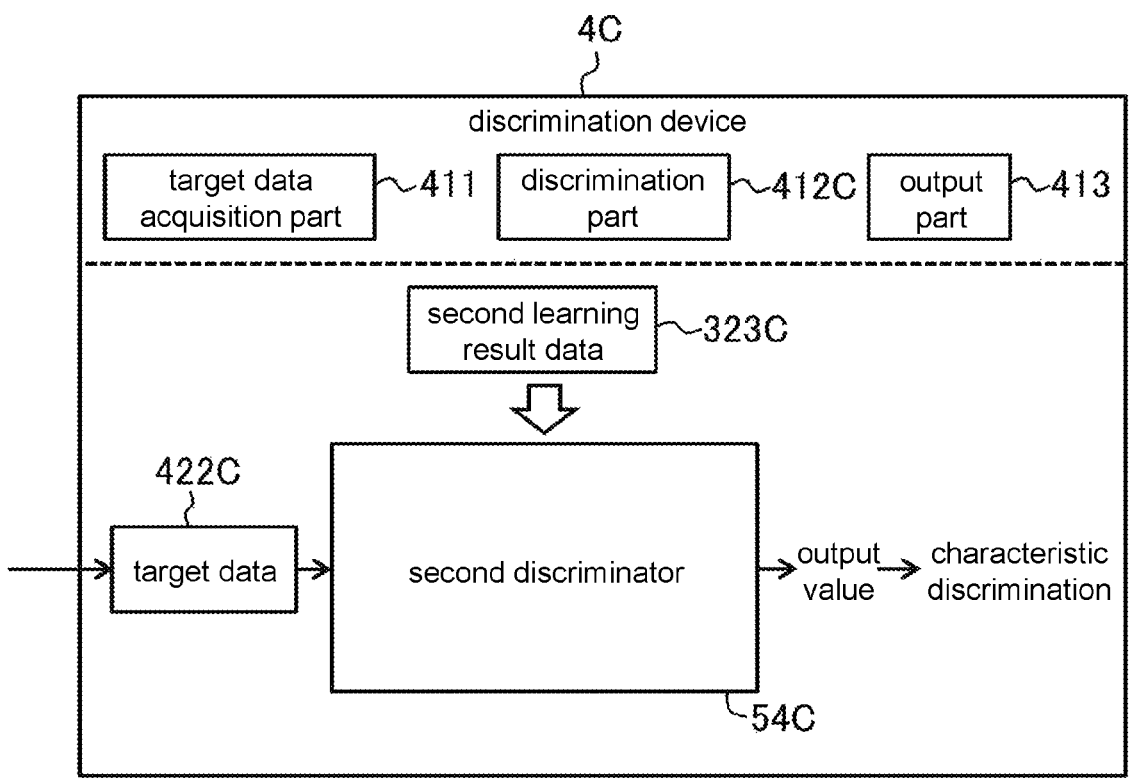
FIG. 22 schematically illustrates an example of the software configuration of the discrimination device according to another embodiment.

A variation example in which the present invention is applied to a scene in which a characteristic included in data is discriminated is described with reference to FIGS. 18 to 22. FIG. 18 schematically illustrates an example of the software configuration of a learning data generation device 1C according to the variation example. FIG. 19 schematically illustrates an example of the software configuration of a first learning device 2C according to the variation example. FIG. 20 schematically illustrates an example of the software configuration of a second learning device 3C according to the variation example. FIGS. 21 and 22 schematically illustrate examples of the hardware configuration and the software configuration of a discrimination device 4C according to the variation example. The discrimination system according to the variation example is configured by the learning data generation device 1C, the first learning device 2C, the second learning device 3C, and the discrimination device 4C. The discrimination system according to the variation example may be configured in the same manner as the inspection system 100, except that the data to be processed is replaced from image data of a product to another type of data having some characteristic.

<Learning Data Generation Device>

The learning data generation device 1C according to the variation example has the same hardware configuration as that of the learning data generation device 1. That is, the learning data generation device 1C is a computer in which the control part 11, the storage part 12, the communication interface 13, the input device 14, the output device 15, and the drive 16 are electrically connected. The storage part 12 of the learning data generation device 1C stores various information such as the first learning result data 129C.

The first learning result data 129C is data for setting a first trained discriminator 51C that has undergone machine learning for determining whether to adopt given data as learning data. The first discriminator 51C is formed of a neural network as in the above embodiment. The first discriminator 51C may be configured by, for example, a multilayered fully-coupled neural network, a recurrent neural network, or the like.

As shown in FIG. 18, the learning data generation device 1C operates as a computer which includes, as the software modules, the data acquisition part 111, the first generation part 112, the determination part 113, and the second generation part 114. The data acquisition part 111, the first generation part 112, the determination part 113, and the second generation part 114 respectively operate in the same manner as those in the above embodiment, except that the image data of the product is replaced with another type of data including some characteristic.

In the variation example, the data to be processed may include all types of data that can be analyzed by the discriminator, which may be, for example, in addition to the image data, sound data (voice data), numerical data, text data, output data from other sensors, or the like. In addition, the characteristics discriminated from the target data may include all characteristics that can be discriminated from the data. When the target data is sound data, the discriminated characteristic may be, for example, whether a specific sound (for example, an abnormal noise of the machine) is included. When the target data is numerical data or text data related to biometric data such as the activity amount, the discriminated characteristic may be, for example, the state of the target (for example, whether the target is healthy) or the like. When the target data is numerical data or text data such as the drive amount of the machine, the discriminated characteristic may be, for example, the machine state (for example, whether the machine is in a predetermined state) or the like.

<First Learning Device>

The first learning device 2C according to the variation example has the same hardware configuration as that of the first learning device 2. That is, the first learning device 2C is a computer in which the control part 21, the storage part 22, the communication interface 23, the input device 24, the output device 25, and the drive 26 are electrically connected. The first learning device 2C constructs the first trained discriminator 51C that is used in the learning data generation device 1C and has undergone machine learning to determine whether to adopt given data as learning data.

As shown in FIG. 19, the first learning device 2C is configured as a computer which includes the first learning data acquisition part 211 and the first learning processing part 212 as the software modules. The first learning data acquisition part 211 and the first learning processing part 212 respectively operate in the same manner as in the above embodiment, except that the image data of the product is replaced with another type of data including some characteristic.

<Second Learning Device>

The second learning device 3C according to the variation example has the same hardware configuration as that of the second learning device 3. That is, the second learning device 3C is a computer in which the control part 31, the storage part 32, the communication interface 33, the input device 34, the output device 35, and the drive 36 are electrically connected. The second learning device 3C constructs, by performing the machine learning using the learning data generated by the learning data generation device 1C, the second trained discriminator 54C that has acquired the ability to discriminate the characteristics from the target data.

As shown in FIG. 20, the second learning device 3C is configured as a computer which includes the second learning data acquisition part 311 and the second learning processing part 312 as the software modules. The second learning data acquisition part 311 and the second learning processing part 312 respectively operate in the same manner as in the above embodiment, except that the image data of the product is replaced with another type of data including some characteristic.

<Discrimination Device>

As shown in FIG. 21, the discrimination device 4C according to the variation example has the same hardware configuration as that of the inspection device 4. The storage part 42 of the discrimination device 4C stores various information such as a discrimination program 421C and second learning result data 323C. The discrimination program 421C is a program for causing the discrimination device 4C to perform information processing for discriminating the characteristics included in the target data by the same processing procedure as the inspection device 4, and includes a series of instructions for the information processing. The second learning result data 323C is data for setting the second trained discriminator 54C.

In the variation example, the discrimination device 4C is connected to a measurement device 81C via the external interface 44. The measurement device 81C is appropriately configured to be capable of acquiring the target data. The type of the measurement device 81C may be appropriately determined according to the data to be processed. When the data to be processed is sound data, the measurement device 81C is, for example, a microphone or the like. When the data to be processed is biometric data, the measurement device 81C is, for example, a device such as an activity meter and a blood pressure monitor that is configured to be capable of measuring biometric information. In addition, when the data to be processed is numerical data or text data such as the drive amount of the machine, the measurement device 81C is, for example, a device such as an encoder that is configured to be capable of measuring the physical amount of the target. The arrangement of the measurement device 81C may be appropriately determined according to the embodiment.

As shown in FIG. 22, the discrimination device 4C operates as a computer which includes the target data acquisition part 411, a discrimination part 412C, and the output part 413 as the software modules by the control part 41 executing the discrimination program 421C. That is, in the variation example, each software module is also realized by the control part 41 (CPU) as in the above embodiment.

The target data acquisition part 411 acquires target data 422C including the characteristics to be discriminated. The discrimination part 412C discriminates the characteristics included in the target data 422C based on output obtained from the second discriminator 54C by inputting the acquired target data 422C to the second discriminator 54C. The output part 413 outputs the result of discriminating the characteristics.

Operation Example

Next, an operation example of the discrimination system according to the variation example is described. The discrimination system according to the variation example operates in substantially the same processing procedure as that of the inspection system 100.

<Learning Data Generation Device>

In step S101, the control part 11 of the learning data generation device 1C operates as the data acquisition part 111, and acquires first data 122C including predetermined characteristics and first correct answer data 123C indicating the correct answer for the discrimination of the characteristics included in the first data 122C. The first data 122C may be acquired appropriately. For example, when the data to be processed is sound data, a microphone is prepared, and the sound data that may include the characteristics to be discriminated is recorded by the prepared microphone. Thereby, the first data 122C can be acquired. Besides, when the first correct answer data 123C is not required, such as in a case of adopting a learning model other than the neural network as the second discriminator 54C and a case of not performing the supervised learning as machine learning, the acquisition of the first correct answer data 123C may be omitted.

In step S102, the control part 11 operates as the first generation part 112 and generates plural pieces of second data 125C of the subject respectively from the first data 122C by applying predetermined conversion processing to the first data 122C. The predetermined conversion processing may be appropriately selected according to the embodiment. When the first data 122C is sound data, the predetermined conversion processing may be selected from, for example, time stretch, pitch shift, masking, amplitude conversion, synthesis of a predetermined sound such as noise, and a combination thereof. The time stretch is processing for changing the tempo (duration) while maintaining the pitch of the sound. The pitch shift is processing for changing the pitch while maintaining the tempo of the sound. The masking is processing for converting (for example, removing) the sound of a specific part. In addition, when the first data 122C is numerical data or text data, the predetermined conversion processing may be selected from, for example, synthesis of predetermined data such as noise, data conversion of a specific part, and a combination thereof.

In step S103, the control part 11 operates as the determination part 113, and refers to the first learning result data 129C determines whether to adopt each piece of the second data 125C as learning data based on the output obtained from the first trained discriminator 51C by inputting each piece of the second data 125C to the first trained discriminator 51C.

Thereby, it is possible to exclude the second data 125C, from among the plural pieces of second data 125C generated from the first data 122C, that is unnatural as the data including the characteristics. When the first data 122C is sound data and the presence or absence of abnormal noise of the machine is discriminated as a characteristic, for example, the second data 125C or the like that cannot determine the presence or absence of abnormal noise of the machine can be excluded.

In step S104, the control part 11 operates as the second generation part 114 and adds, to the second data 125C determined to be adopted as learning data of the machine learning for acquiring the ability to discriminate the characteristics included in the target data, second correct answer data 126C that is determined based on the first correct answer data 123C and indicates the correct answer for the discrimination of the characteristics included in the second data 125C. Thereby, the control part 11 generates a learning data set 127C configured by a pair of the second data 125C and the second correct answer data 126C.

Besides, the control part 11 may generate a learning data group configured by plural pieces of learning data sets 127C by collecting plural pieces of second data 125C determined to be adopted as learning data and adding the second correct answer data 126C to each piece of the collected second data 125C. In addition, similar to the first correct answer data 123C, when the second correct answer data 126C is not required, the addition of the second correct answer data 126 to the second data 125C may be omitted. In this case, the control part 11 may collect the second data 125C determined to be adopted as learning data and generate a learning data group configured by the plural pieces of second data 125C.

<First Learning Device>

The control part 21 of the first learning device 2 constructs, by the processing in steps S201 to S203, the first trained discriminator 51C that has acquired the ability to determine whether to adopt given data as learning data of the machine learning for acquiring the ability to discriminate the characteristics.

That is, in step S201, the control part 21 operates as the first learning data acquisition part 211, and acquires plural pieces of first learning data sets 222C respectively configured by a combination of data 2221C that may include the characteristics to be discriminated and data acceptance/rejection data 2222C indicating the correct answer for the determination on whether to adopt the data 2221C as learning data.

In step S202, the control part 21 operates as the first learning processing part 212 and prepares a neural network 52C to be subjected to learning processing. Next, the control part 21 uses each piece of the first learning data sets 222C to perform machine learning of the neural network 52C so as to output the output value corresponding to the correct answer indicated by the acceptance/rejection data 2222C when the data 2221C is input. Thereby, the control part 21 can construct the trained neural network 52C (that is, the first discriminator 51C) that has acquired the ability to determine whether to adopt given data as learning data.

In step S203, the control part 21 operates as the first learning processing part 212 and stores, in the storage part 22, information indicating the configuration of the neural network 52C after learning (that is, the first discriminator 51C) as the first learning result data 129C. The first discriminator 51C according to the variation example may be configured by the discrimination model 62 as in the variation example of <4.6>. At this time, instead of the image data 2223, a predetermined type of data whose characteristics are to be discriminated is used.

<Second Learning Device>

The control part 31 of the second learning device 3C constructs, by the processing in steps S301 to S303, the second trained discriminator 54C that has acquired the ability to discriminate the characteristics included in the target data.

That is, in step S301, the control part 31 operates as the second learning data acquisition part 311, and acquires plural pieces of second learning data sets 322C respectively configured by a combination of data 3221C including predetermined characteristics and correct answer data 3222C indicating the correct answer for the discrimination of the characteristics included in the data 3221C. At least some of the plural pieces of second learning data sets 322C are the learning data sets (learning data sets 127C) generated by the learning data generation device 1.

In step S302, the control part 31 operates as the second learning processing part 312 and prepares a neural network 53C subjected to learning processing. Next, the control part 31 uses each piece of the second learning data sets 322C to perform machine learning of the neural network 53C so as to output the output value corresponding to the correct answer indicated by the correct answer data 3222C when the data 3221C is input. Thereby, the control part 31 can construct the trained neural network 53C (that is, the second discriminator 54C) that has acquired the ability to discriminate the characteristics included in the target data.

In step S303, the control part 31 operates as the second learning processing part 312 and stores, in the storage part 32, information indicating the configuration of the neural network 53C after learning (that is, the second discriminator 54C) as the second learning result data 323C. Besides, as in the above embodiment, the control part 31 may transmit one or more second learning data sets 322C selected from the plural pieces of second learning data sets 322C to the learning data generation device 1C. Then, the control part 31 may use the transmitted second learning data sets 322C as the combinations of the first data 122C and the first correct answer data 123C, and request the learning data generation device 1C to generate plural pieces of learning data sets 127C. Accordingly, by receiving the plural pieces of learning data sets 127C generated by the learning data generation device 1C, the control part 31 can increase the number of pieces of the second learning data sets 322C used for machine learning.

<Discrimination Device>

In step S401, the control part 41 of the discrimination device 4C operates as the target data acquisition part 411 and acquires the target data 422C including the characteristics to be discriminated. In the variation example, the control part 41 acquires the target data 422C from the measurement device 81C via the external interface 44. However, the route for acquiring the target data 422C may not be limited to this example and may be appropriately selected according to the embodiment.

In step S402, the control part 41 operates as the discrimination part 412C, and refers to the second learning result data 323C to set the trained second discrimination part 54C. Subsequently, the control part 41 inputs the target data 422C acquired in step S401 to the second discriminator 54C, and executes calculation processing of the second discriminator 54C. Thereby, the control part 41 acquires an output value corresponding to the result of discriminating the characteristics included in the target data 422C from the second discriminator 54C. The control part 41 discriminates the characteristics included in the target data 422C based on the output value acquired from the second discriminator 54C.

In step S403, the control part 41 operates as the output part 413 and outputs the result of discriminating the characteristics included in the target data 422C. The output format of the determination result may not be particularly limited and may be appropriately selected according to the embodiment. For example, the control part 41 may directly output the result of determining the characteristics included in the target data 422C from the output device 46. In addition, for example, the control part 41 may execute predetermined output processing according to the determination result. As a specific example, in a case where the target data 422C is sound data and it is determined whether an abnormal noise of the machine is included as the characteristic of the sound data, the control part 41 may perform, when it is discriminated that the target data 422C includes the abnormal noise of the machine, transmission of an e-mail that warns an administrator portable terminal of the machine as the output processing. In addition, when the discrimination device 4C is connected to the target machine, the control part 41 may reduce the processing speed of the target machine or stop the operation of the target machine.

As described above, in the variation example, by increasing the number of pieces of the second learning data sets 322C by the learning data sets generated by the learning data generation device 1C, an appropriate number of second learning data sets 322C can be prepared at low cost. Thereby, it is possible to construct the second discriminator 54C having relatively high precision of discriminating the characteristics included in the target data by performing the machine learning using the prepared sufficient number of pieces of second learning data sets 322C in the second learning device 3C. Consequently, according to the embodiment, it is possible to generate the second discriminator 54C having relatively high inference precision at low cost.

What is claimed is:

1. An inspection system that inspects an acceptability of a product, comprising a first processor, a second, a second processor and a third processor, wherein
the first processor is configured to:
acquire first image data of the product and first correct answer data indicating a correct answer for an acceptability determination of the product in the first image data;
generate plural pieces of second image data of the product respectively from the first image data by applying predetermined conversion processing to the first image data;
determine whether to adopt each piece of the second image data as learning data based on output obtained from a first trained discriminator by inputting each piece of the second image data to the first discriminator, the first discriminator has undergone machine learning for determining whether to adopt given image data as learning data; and
generate a learning data set comprising pairs of the second image data and second correct answer data by adding the second correct answer data to the second image data, the second image data being determined to be adopted as learning data, the second correct answer data being determined based on the first correct answer data and indicating the correct answer for the acceptability determination of the product in the second image data,
the second processor is configured to construct, by performing machine learning using the generated learning data set, a second trained discriminator that has acquired an ability to determine the acceptability of the product,
the third processor is configured to:
acquire target image data of the product to be inspected; and
determine, based on output obtained from the second discriminator by inputting the acquired target image data to the second discriminator, the acceptability of the product in the target image data.

2. The inspection system according to claim 1, wherein the first processor generates the plural pieces of second image data from the first image data by applying, to the first image data, conversion processing selected from photometric conversion, geometric conversion, image synthesis, image replacement, and a combination thereof.

3. The inspection system according to claim 1, wherein the first discriminator comprises a discrimination model of a network comprising a generation model and the discrimination model, the generation model performs machine learning on an image data group comprising third image data to generate fourth image data similar to the third image data and repeats the machine learning to generate the fourth image data similar to the third image data in which the discrimination model misdiscriminates, the discrimination model performs machine learning to discriminate whether input data that is input is the fourth image data derived from the generation model or the third image data derived from the image data group, and to discriminate the third image data from the fourth image data that is generated by the generation model repeatedly subjected to the machine learning.

4. The inspection system according to claim 1, wherein the first processor uses, as the first discriminator, a trained learner that is generated by machine learning using fifth image data and third correct answer data indicating the correct answer for whether to adopt the fifth image data as the learning data.

5. A discriminator generation system, comprising a first processor and a second processor, wherein
the first processor is configured to:
acquire first image data of a product and first correct answer data indicating a correct answer for an acceptability determination of the product in the first image data;
generate plural pieces of second image data of the product respectively from the first image data by applying predetermined conversion processing to the first image data;
determine whether to adopt each piece of the second image data as learning data based on output obtained from a first trained discriminator by inputting each piece of the second image data to the first discriminator, the first discriminator has undergone machine learning for determining whether to adopt given image data as learning data; and
generate a learning data set comprising pairs of the second image data and second correct answer data by adding the second correct answer data to the second image data, the second image data being determined to be adopted as learning data, the second correct answer data being determined based on the first correct answer data and indicating the correct answer for the acceptability determination of the product in the second image data,
the second processor is configured to construct, by performing machine learning using the generated learning data set, a second trained discriminator that has acquired an ability to determine an acceptability of the product.

6. A learning data generation device, comprising:
a processor, configured to:
acquire first image data of a product and first correct answer data indicating a correct answer for an acceptability determination of the product in the first image data;
generate plural pieces of second image data of the product respectively from the first image data by applying predetermined conversion processing to the first image data;
determine whether to adopt each piece of the second image data as learning data based on output obtained from a first trained discriminator by inputting each piece of the second image data to the first discriminator, the first discriminator has undergone machine learning for determining whether to adopt given image data as learning data; and
generate a learning data set comprising pairs of the second image data and second correct answer data by adding the second correct answer data to the second image data, the second image data being determined to be adopted as learning data, the second correct answer data being determined based on the first correct answer data and indicating the correct answer for the acceptability determination of the product in the second image data.

7. An image discrimination system, comprising a first processor, a second processor and a third processor, wherein
the first processor is configured to:
acquire first image data of a predetermined subject;
generate plural pieces of second image data of the subject respectively from the first image data by applying predetermined conversion processing to the first image data;
determine whether to adopt each piece of the second image data as learning data based on output obtained from a first trained discriminator by inputting each piece of the second image data to the first discriminator, the first discriminator has undergone machine learning for determining whether to adopt given image data as learning data; and
generate, by collecting second image data determined to be adopted as learning data, a learning data group comprising the plural pieces of second image data determined to be adopted as learning data,
the second processor is configured to construct a second trained discriminator that has acquired an ability to discriminate characteristics of the subject by performing machine learning using the generated learning data group,
the third processor is configured to:
acquire target image data of the subject in which characteristics are discriminated; and
discriminate the characteristics of the subject in the target image data based on output obtained from the second discriminator by inputting the acquired target image data to the second discriminator.

8. A discriminator generation system, comprising a first processor and a second processor, wherein
acquire first image data of a predetermined subject;
generate plural pieces of second image data of the subject respectively from the first image data by applying predetermined conversion processing to the first image data;
determine whether to adopt each piece of the second image data as learning data based on output obtained from a first trained discriminator by inputting each piece of the second image data to the first discriminator, the first discriminator has undergone machine learning for determining whether to adopt given image data as learning data; and
generate, by collecting second image data determined to be adopted as learning data, a learning data group comprising the plural pieces of second image data determined to be adopted as learning data,
the second processor is configured to construct a second trained discriminator that has acquired an ability to discriminate characteristics of the subject by performing machine learning using the generated learning data group.

9. A learning data generation device, comprising:
a processor, configured to:
acquire first image data of a predetermined subject;
generate plural pieces of second image data of the subject respectively from the first image data by applying predetermined conversion processing to the first image data;
determine whether to adopt each piece of the second image data as learning data based on output obtained from a first trained discriminator by inputting each piece of the second image data to the first discriminator, the first discriminator has undergone machine learning for determining whether to adopt given image data as learning data; and
generate, by collecting second image data determined to be adopted as learning data, a learning data group comprising the plural pieces of second image data determined to be adopted as learning data.

10. A discrimination system, comprising a first processor, a second processor and a third processor, wherein
the first processor is configured to:

-acquire first data comprising predetermined characteristics;
generate plural pieces of second data from the first data by applying predetermined conversion processing to the first data;
determine whether to adopt each piece of the second data as learning data based on output obtained from a first trained discriminator by inputting each piece of the second data to the first discriminator, the first discriminator has undergone machine learning for determining whether to adopt given data as learning data; and
generate, by collecting second data determined to be adopted as learning data, a learning data group comprising the plural pieces of second data determined to be adopted as learning data,
the second processor is configured to construct a second trained discriminator that has acquired an ability to discriminate the characteristics by performing machine learning using the generated learning data group,
the third processor is configured to:
acquire target data comprising the characteristics to be discriminated; and
discriminate the characteristics of the target data based on output obtained from the second discriminator by inputting the acquired target data to the second discriminator.

11. The discrimination system according to claim 10,
wherein the first data is sound data, and
the first processor generates plural pieces of second data from the first data by applying, to the first data, the conversion processing selected from time stretch, pitch shift, masking, amplitude conversion, sound synthesis, and a combination thereof.

12. A discriminator generation system, comprising a first processor and a second processor, wherein
the first processor is configured to:
acquire first data comprising predetermined characteristics;
generate plural pieces of second data from the first data by applying predetermined conversion processing to the first data;
determine whether to adopt each piece of the second data as learning data based on output obtained from a first trained discriminator by inputting each piece of the second data to the first discriminator, the first discriminator has undergone machine learning for determining whether to adopt given data as learning data; and
generate, by collecting second data determined to be adopted as learning data, a learning data group comprising the plural pieces of second data determined to be adopted as learning data,
the second processor is configured to construct a second trained discriminator that has acquired an ability to discriminate the characteristics by performing machine learning using the generated learning data group.

13. A learning data generation device, comprising:
a processor, configured to:
acquire first data comprising predetermined characteristics;
generate plural pieces of second data from the first data by applying predetermined conversion processing to the first data;
determine whether to adopt each piece of the second data as learning data based on output obtained from a first trained discriminator by inputting each piece of the second data to the first discriminator, the first discriminator has undergone machine learning for determining whether to adopt given data as learning data; and
generate, by collecting second data determined to be adopted as learning data, a learning data group comprising the plural pieces of second data determined to be adopted as learning data.

14. The inspection system according to claim 2,
wherein the first discriminator comprises a discrimination model of a network comprising a generation model and the discrimination model, the generation model performs machine learning on an image data group comprising third image data to generate fourth image data similar to the third image data and repeats the machine learning to generate the fourth image data similar to the third image data in which the discrimination model misdiscriminates, the discrimination model performs machine learning to discriminate whether input data that is input is the fourth image data derived from the generation model or the third image data derived from the image data group, and to discriminate the third image data from the fourth image data that is generated by the generation model repeatedly subjected to the machine learning.

15. The inspection system according to claim 2,
wherein the first processor uses, as the first discriminator, a trained learner that is generated by machine learning using fifth image data and third correct answer data indicating the correct answer for whether to adopt the fifth image data as the learning data.

\* \* \* \* \*